US008019592B2

(12) United States Patent
Fukuoka et al.

(10) Patent No.: US 8,019,592 B2
(45) Date of Patent: *Sep. 13, 2011

(54) INFORMATION TERMINAL DEVICE AND METHOD FOR PURCHASING AND ADDING ADDITIONAL PROGRAM FUNCTIONS

(75) Inventors: Norio Fukuoka, Yokohama (JP); Masaya Honma, Tokyo (JP); Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 945 days.

This patent is subject to a terminal disclaimer.

(21) Appl. No.: 11/944,292

(22) Filed: Nov. 21, 2007

(65) Prior Publication Data
US 2008/0086544 A1  Apr. 10, 2008

Related U.S. Application Data

(62) Division of application No. 10/622,089, filed on Jul. 17, 2003, now abandoned.

(30) Foreign Application Priority Data

Jul. 18, 2002 (JP) .............................. 2002-209734
Jul. 18, 2002 (JP) .............................. 2002-209735

(51) Int. Cl.
*G06F 17/20* (2006.01)
(52) U.S. Cl. ........................................................ 704/8
(58) Field of Classification Search .................. 704/8
See application file for complete search history.

(56) References Cited

U.S. PATENT DOCUMENTS

| 6,711,551 | B1* | 3/2004 | Itakura et al. ........... 705/26 |
| 7,272,659 | B2* | 9/2007 | Fukuoka ................... 709/231 |
| 7,636,564 | B2* | 12/2009 | Funato ...................... 455/412.1 |
| 7,664,630 | B2* | 2/2010 | Fukuoka et al. ............. 704/8 |
| 7,779,154 | B2* | 8/2010 | Lipsanen et al. ........... 709/239 |

FOREIGN PATENT DOCUMENTS

JP      2001-290812       10/2001

OTHER PUBLICATIONS

Decision of Rejection for Japanese Patent Application No. 2002-209734, dated Dec. 4, 2007 (2 pgs.) with translation (2 pgs.).
Yamamoto, J., "Effective Use of Active Server Pages," *The First Windows NY Powers*, vol. 1, vol. 2, Kabushiki Kaisha B.N.N. (Jun. 9, 1997) vol. 1, pp. 170.
Mizuno, T., "Plans for Improving Usability of Web," *Open Design*, vol. 9, vol. 4, Japan, CQ Publishing Co., Ltd., (Feb. 28, 2002) vol. 9, pp. 117.

* cited by examiner

*Primary Examiner* — Susan McFadden
(74) *Attorney, Agent, or Firm* — Straub & Pokotylo; John C. Pokotylo

(57) ABSTRACT

An information terminal device and method for upgrading a program simply and flexibly and an upgraded program is described. In many cases, a program running on a computer has additional functions prepared separately so that they can be added to that program as necessary. To use the additional functions, a user may purchase a new version of that program and install it on their computer by selecting icons which link to the new version of the program.

12 Claims, 25 Drawing Sheets

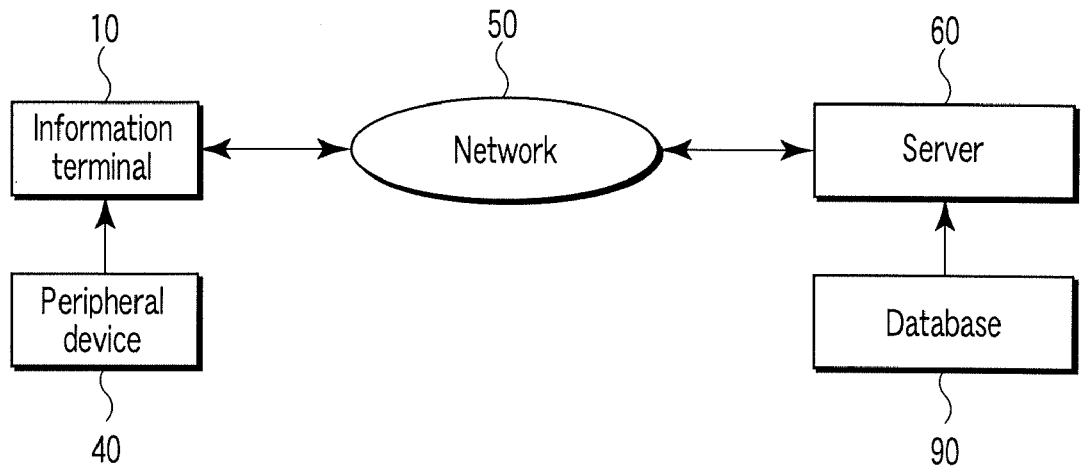
F I G. 1
Address : www.olympus.co.jp/service/etc/
Language ID : JP
URL : http://www.olympus.co.jp/service/etc.jsp?langid=/JP
F I G. 2A
Address : www.olympus.co.jp/service/etc/
Serial No. : 12345
URL : http://www.olympus.co.jp/service/etc.jsp?serial=12345
F I G. 2B

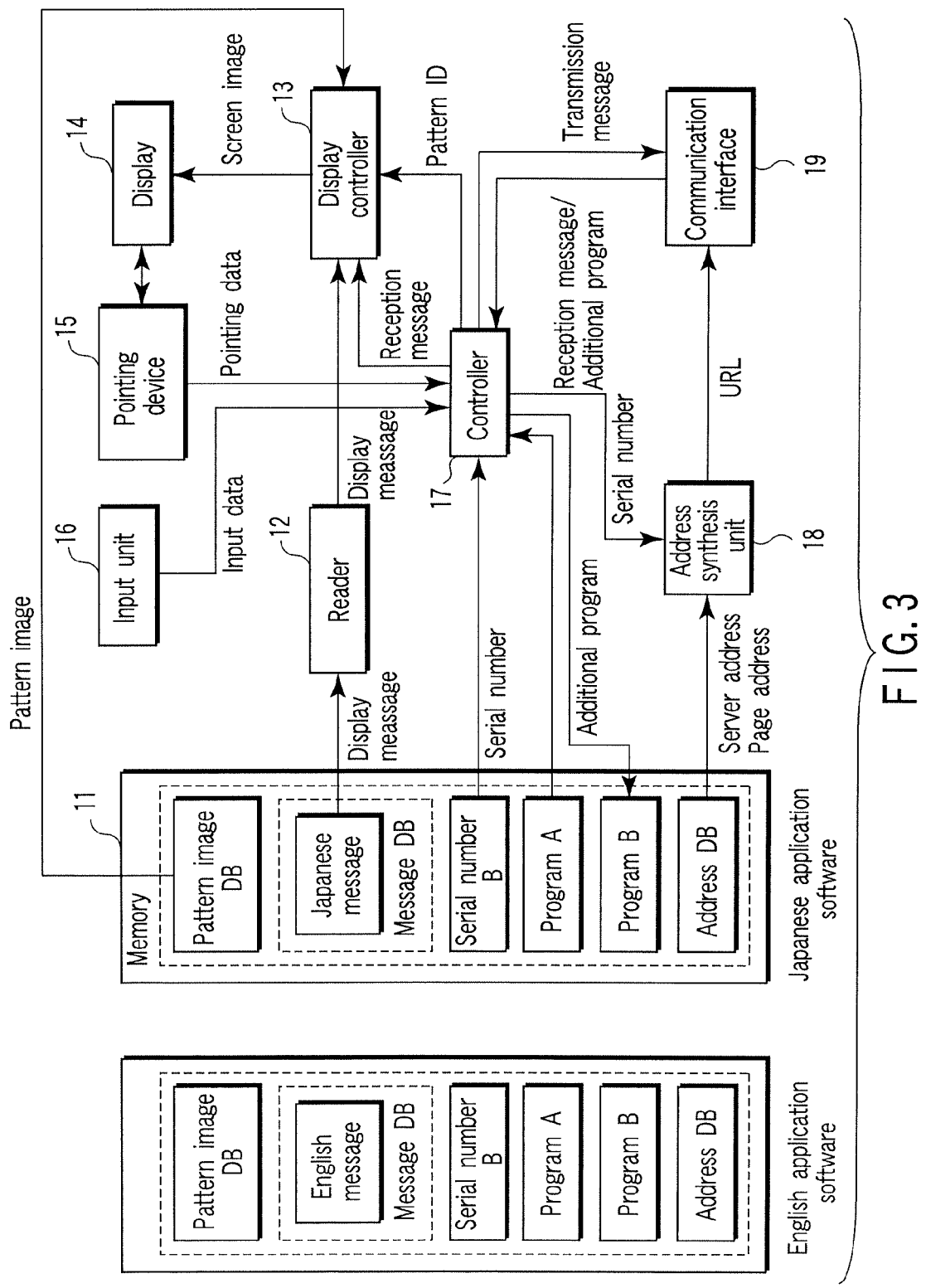
F I G. 3

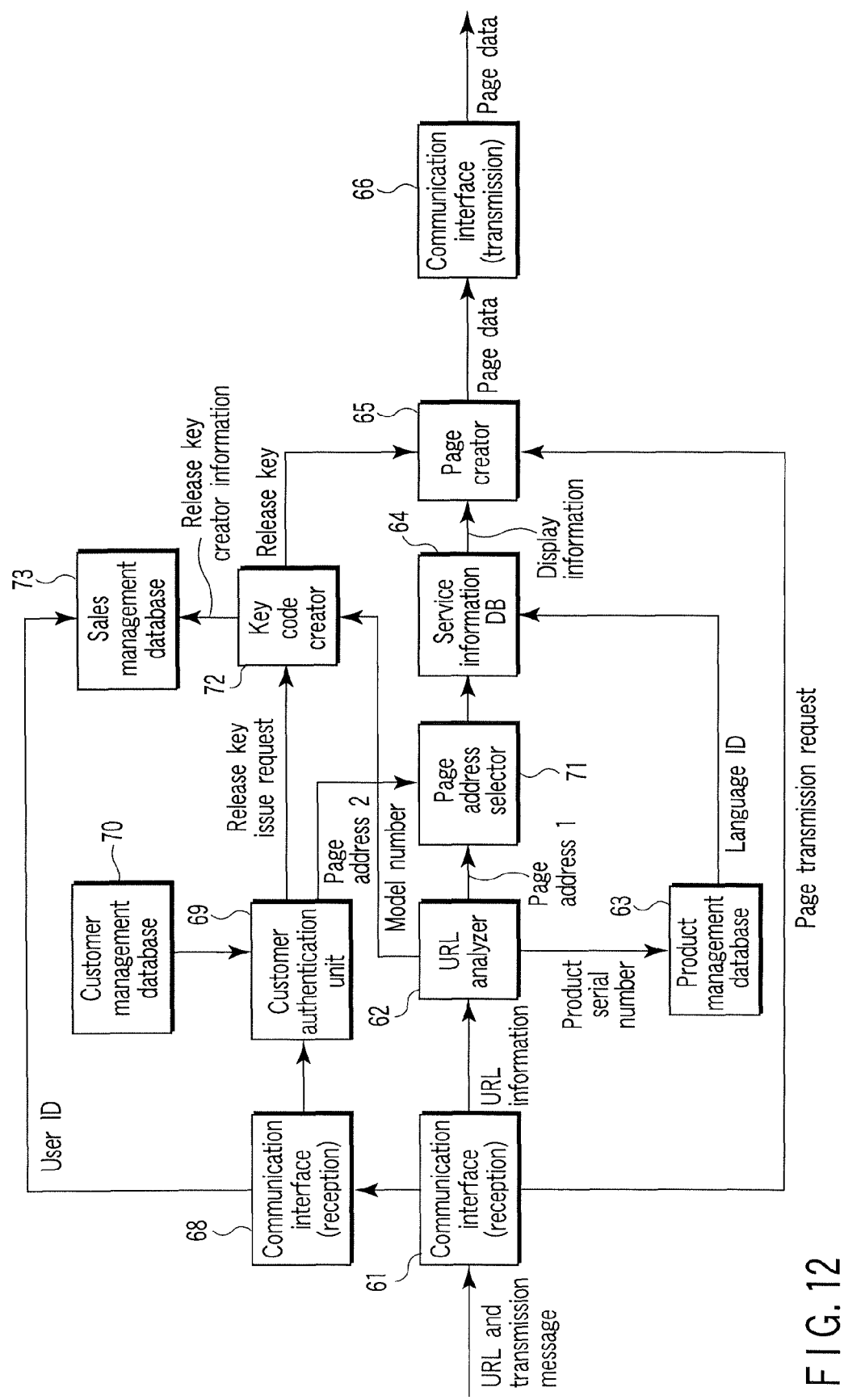
F I G. 12

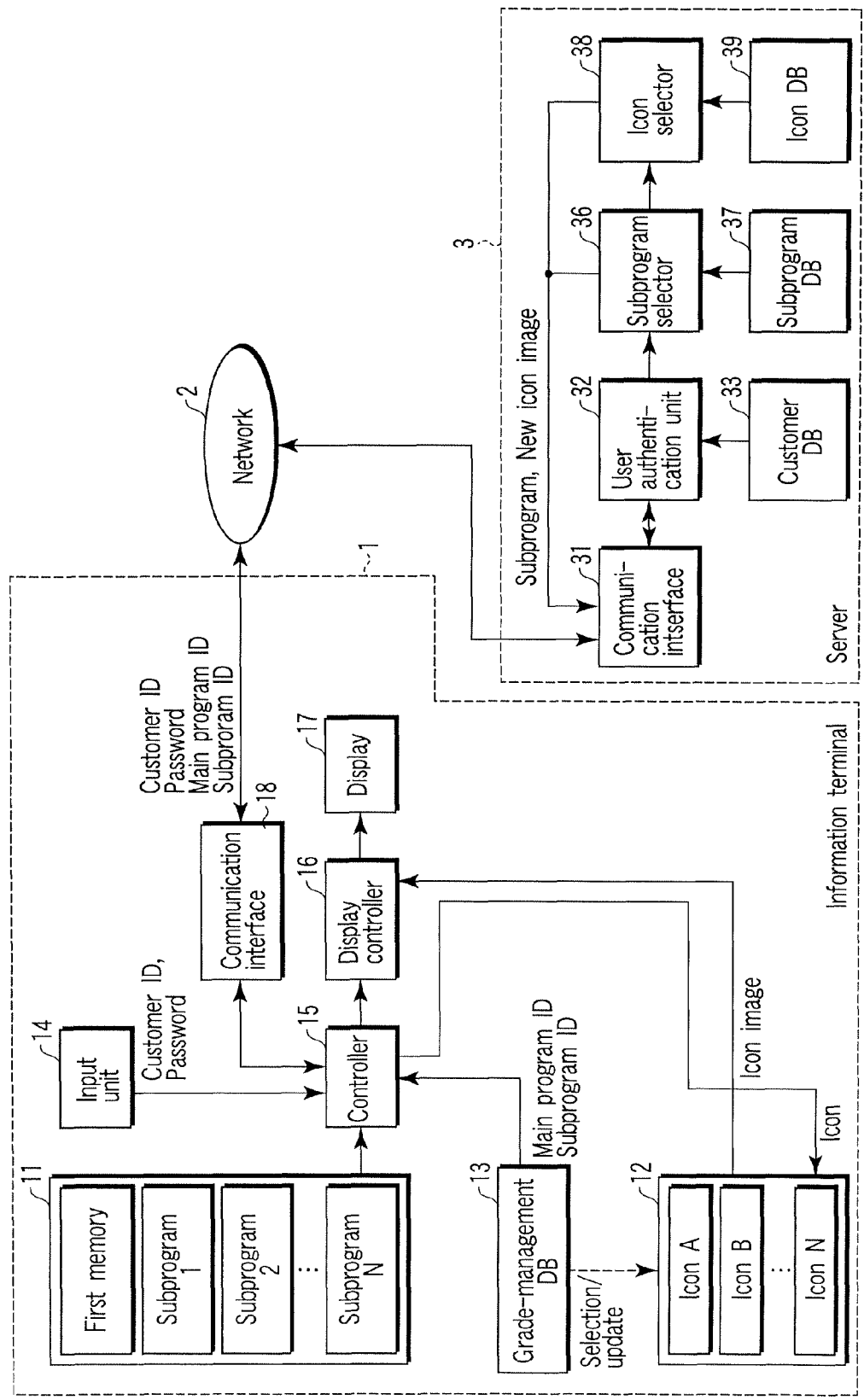
F I G. 17

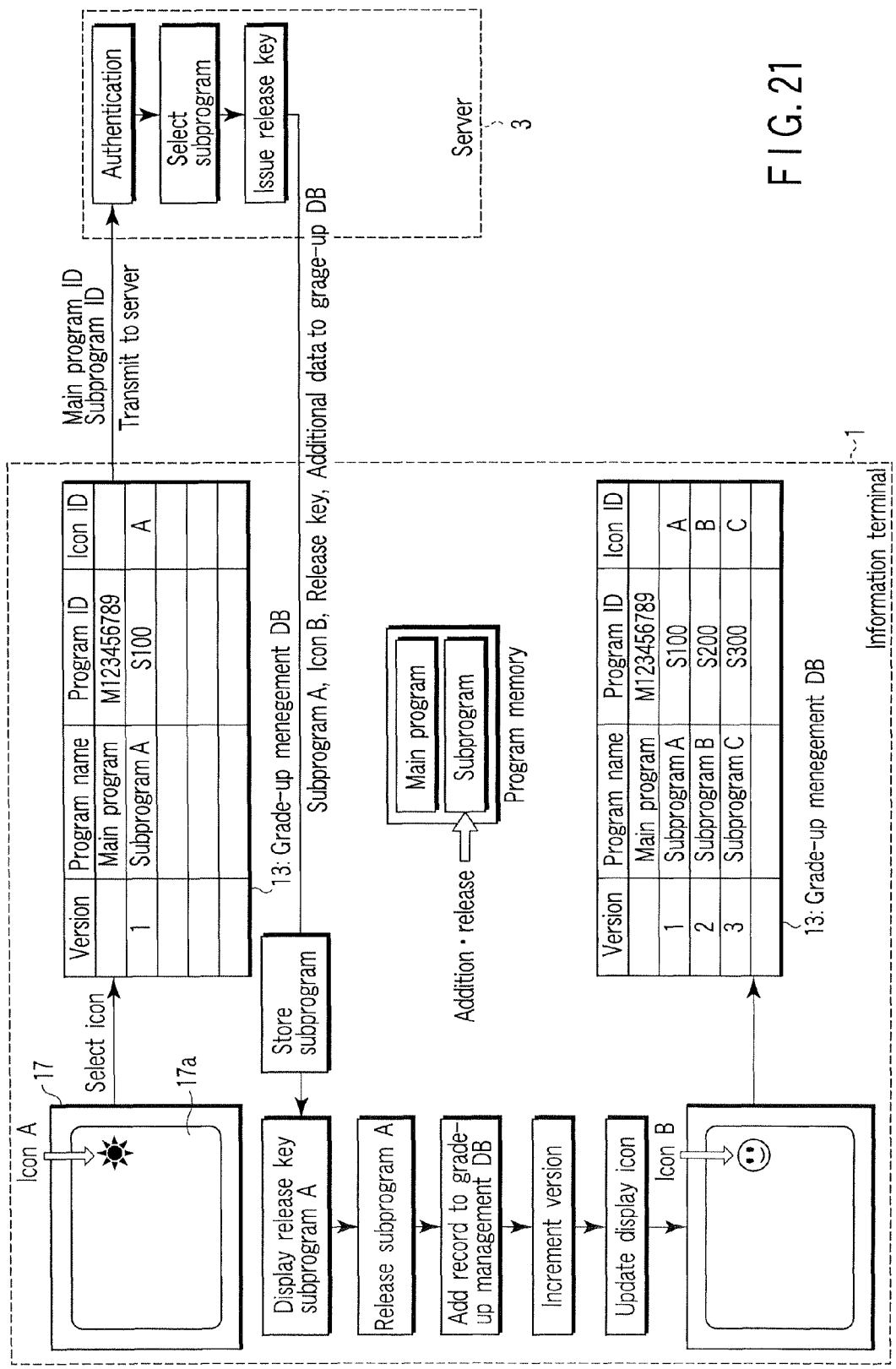
F I G. 21

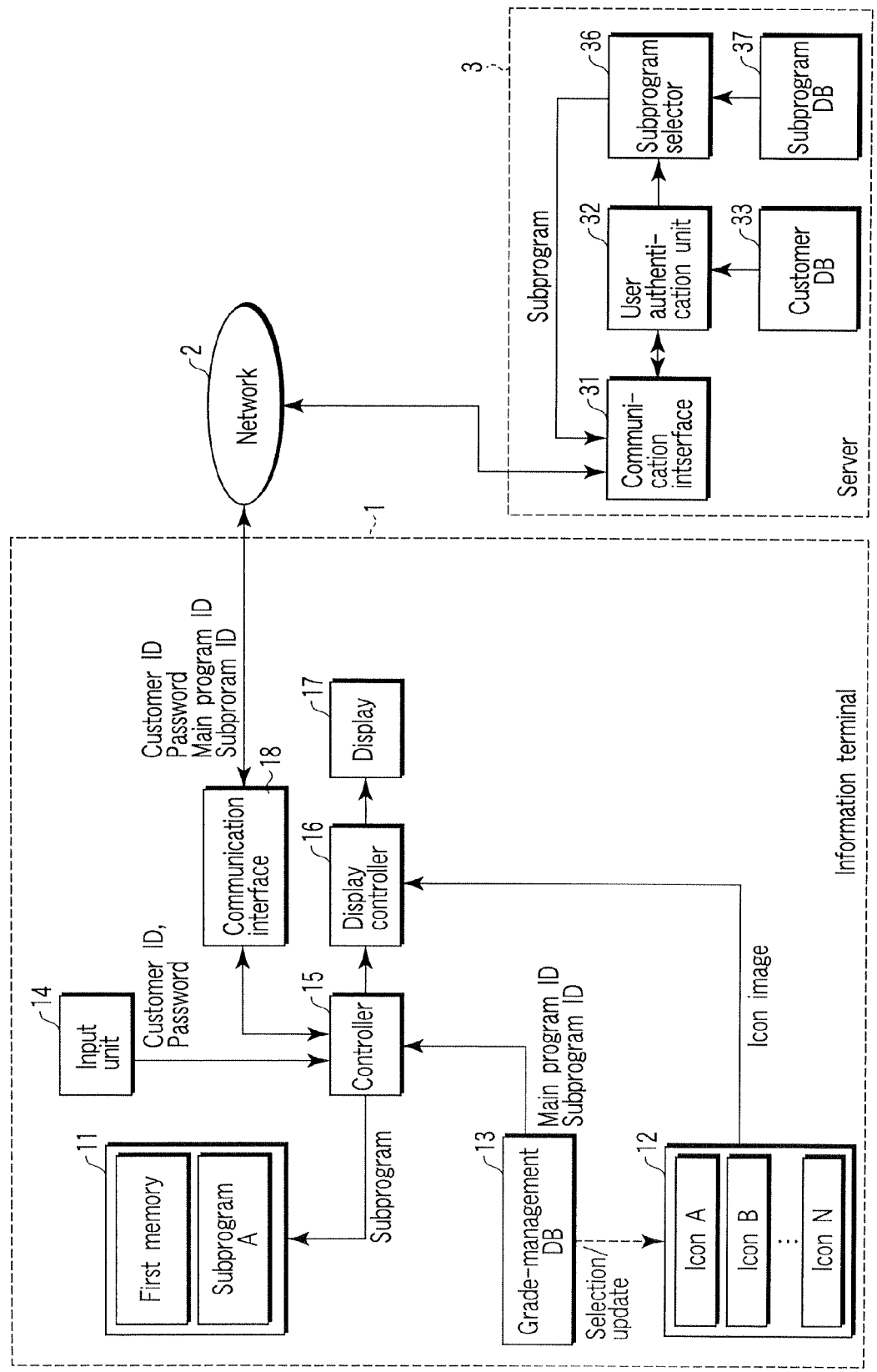
F I G. 23

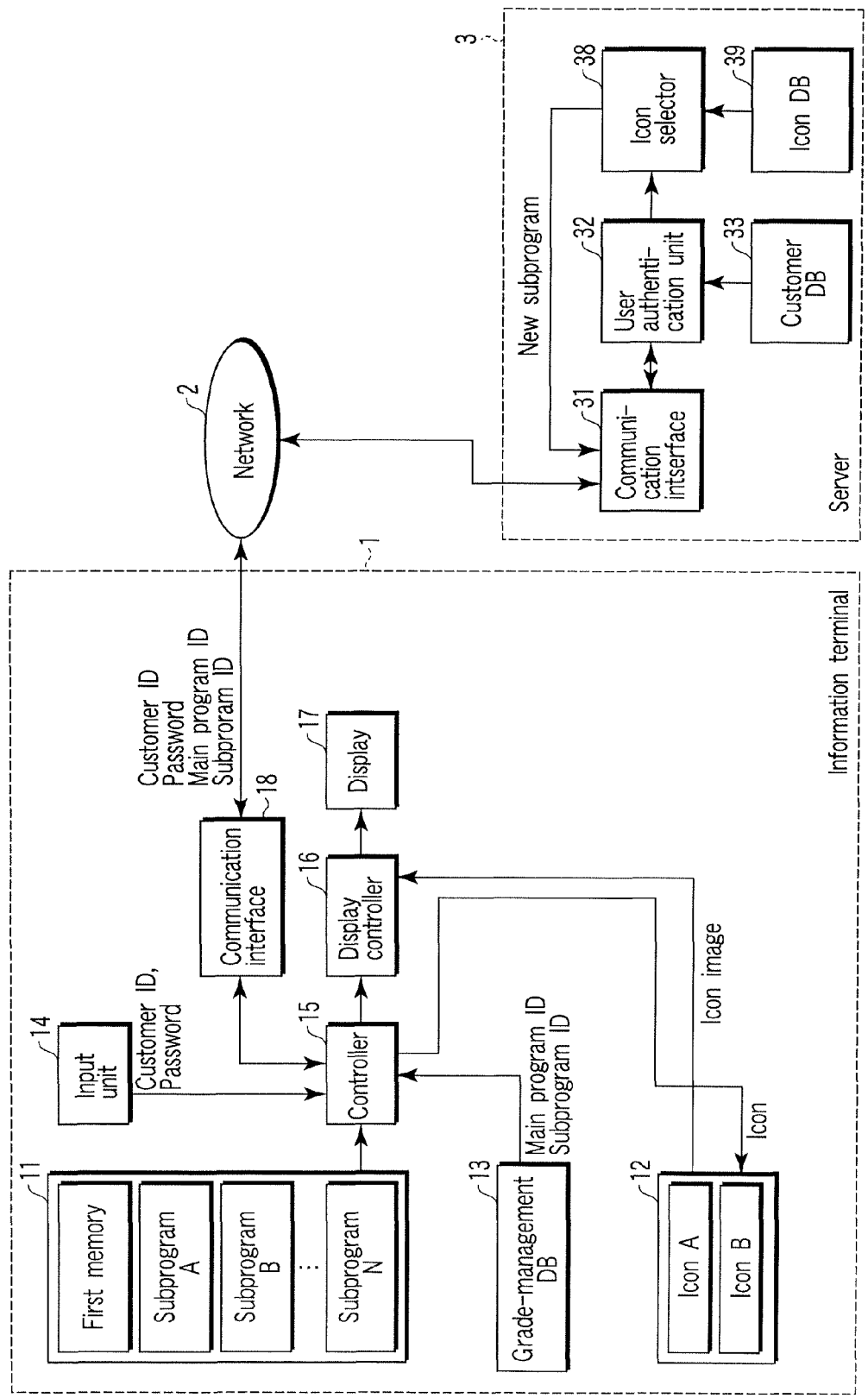
F I G. 26

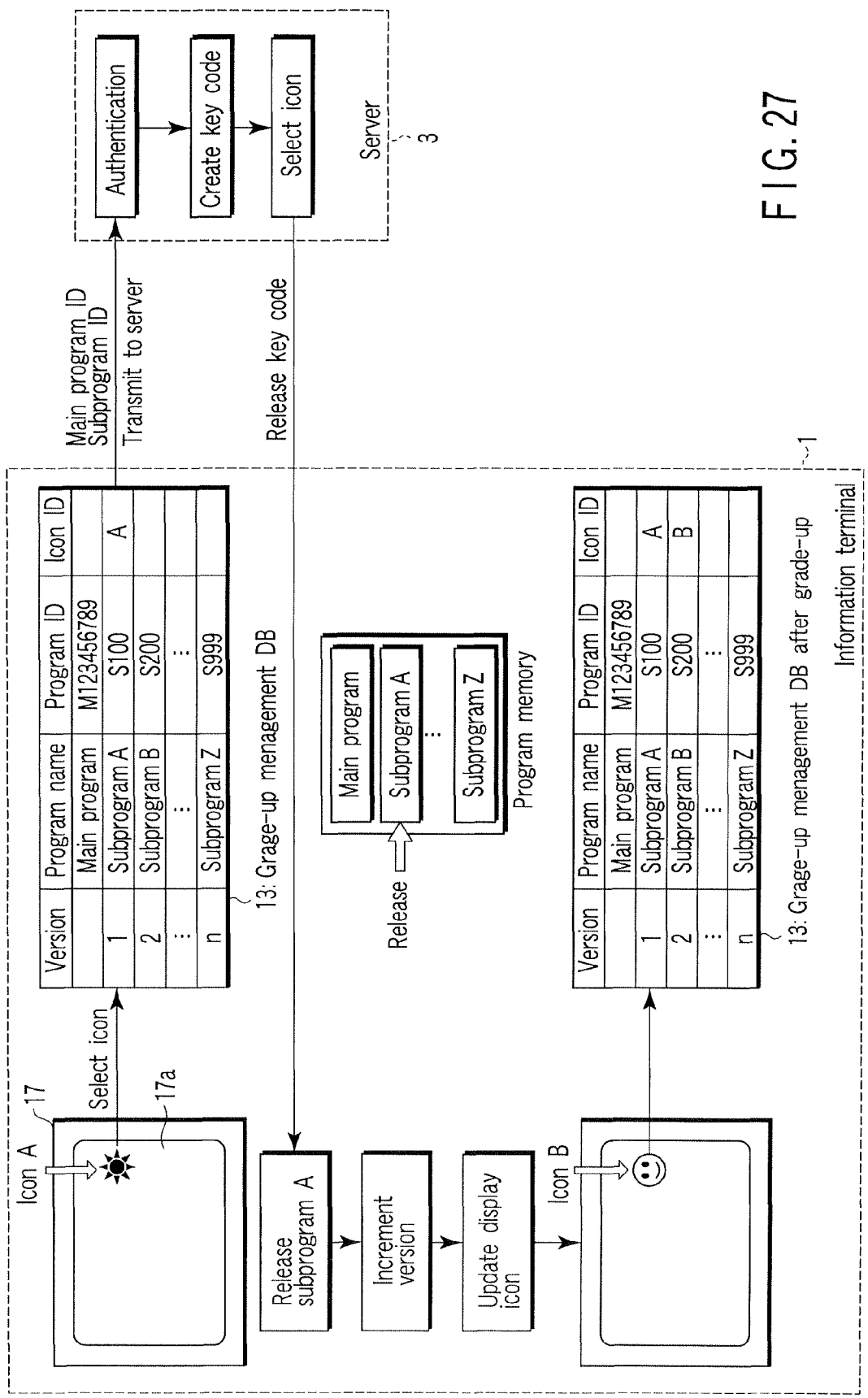
F I G. 27

INFORMATION TERMINAL DEVICE AND METHOD FOR PURCHASING AND ADDING ADDITIONAL PROGRAM FUNCTIONS

CROSS-REFERENCE TO RELATED APPLICATIONS

This application is a divisional of U.S. patent application Ser. No. 10/622,089 (incorporated herein by reference), filed on Jul. 17, 2003 now abandoned, titled "INFORMATION TERMINAL DEVICE, METHOD OF ACQUIRING INFORMATION CORRESPONDING TO LANGUAGE IDENTIFICATION INFORMATION FROM SERVER AND PROGRAM THEREOF, NETWORK SYSTEM, ADDITIONAL FUNCTION PURCHASING" and listing Norio FUKUOKA, et al as inventors, which is based upon and claims the benefit of priority from the prior Japanese Patent Application No. 2002-209734, filed Jul. 18, 2002; and No. 2002-209735, filed Jul. 18, 2002, the entire contents of which are incorporated herein by reference.

BACKGROUND OF THE INVENTION

1. Field of the Invention

The present invention relates to a technique for acquiring information from a server via a network. More particularly, the present invention relates to a technique for acquiring information which can be displayed in a language identical to a language of an application program in use. The present invention further relates to an information terminal device and a method for upgrading a program simply and flexibly and an upgraded program.

2. Description of the Related Art

When a search is made by using a browser screen, it is necessary to input a URL (Uniform Resource Locator) such as a company name, but it is hard to keep a URL such as a company name in mind.

In order to solve the above-mentioned problem, Jpn. Pat. KOKAI Publication No. 2001-23430 discloses methods of manually inputting a server name to a URL, and manually inputting a name configuring a combination of low-order displays of postal codes and addresses as a specific ID code which is generally known, and a telephone number as a URL file name.

In addition, Jpn. Pat. KOKAI Publication No. 10-171810 discloses determination of a target language from a domain name allocated to a host of a customer device. In more detail, there is described storing in advance a language corresponding to a last portion of domain information in a server and determining a language from a last element of domain information, i.e., from information which the customer device has stored in advance as a located country or types such as company, government, educational institute.

On the other hand, in many cases, a program running on a computer has additional functions prepared separately so that they can be added to that program as necessary. To use the additional functions, a user simply purchases a new version of that program and installs it into his or her own computer.

In such a case, the user can get a program which contains the additional functions by purchasing a recording medium, such as a CD-ROM, on which the program is recorded or by downloading the program into his or her computer via a communication line.

BRIEF SUMMARY OF THE INVENTION

An information terminal device according to the first aspect of the present invention is characterized by comprising: an acquisition unit acquiring language identification information concerning a language used on a display screen; a storage unit storing address information of a server; a language identification information synthesizer synthesizing the language identification information into the address information; and a transmitter transmitting the address information to the server.

An information terminal device according to the second aspect of the present invention is characterized by comprising: an input unit inputting a user's voice; a use language recognizer recognizing a use language based on the user's voice; a storage unit storing address information of a server; an acquisition unit acquiring language identification information concerning a use language recognized by the use recognition means; a language identification information synthesizer reading address information from the storage unit and automatically synthesizing the language identification information with the address information, when the language identification information is acquired; and a transmitter transmitting the address information to a server.

An information terminal device according to the third aspect of the present invention is characterized by comprising: a display unit displaying link information for linking with a transmission server on a display screen; a storage unit storing address information of the transmission server; an acquisition unit acquiring language identification information concerning a language used on the display screen; a language identification information synthesizer, when the link information is selected, reading out the address information and automatically synthesizing the acquired language identification information with the address information; a specification unit specifying a user; and a transmitter transmitting the address information and user information to the server.

An information terminal device according to the fourth aspect of the present invention is characterized by comprising: a storage unit storing a first program, a plurality of second programs which are allowed to be activated by a predetermined release key and a plurality of link information which correspond to the plurality of second programs; a display unit displaying first link information selected from the plurality of link information; a transmitter transmitting to the server identification information for identifying the corresponding program stored in the storage unit, when the first link information is selected; a reception unit receiving a release key transmitted from the server as a result of the identification information having been verified by the server; a controller selecting a second program corresponding to the release key received from the server from the storage unit and selecting second link information corresponding to a second program different from the selected second program; and a display controller changing the first link information displayed on the display unit to the second link information.

An information terminal device according to the fifth aspect of the present invention is characterized by comprising: a storage unit storing a first program and first link information; a display unit displaying the first link information; a transmitter transmitting to the server identification information for identifying the first program or the first link information, when the first link information is selected; a reception unit receiving a second program transmitted from the server and second link information corresponding to a third program stored in the server after the identification information has been verified by the server, and a controller making the storage unit store the second program and the second link information received from the server and changing the first link information displayed on the display unit to the second link information stored in the storage unit.

An information terminal device according to the sixth aspect of the present invention is characterized by comprising: a storage unit storing a first program and first link information; a display unit displaying the first link information; a transmitter transmitting to the server identification information for identifying the first program, when the first link information is selected; a reception unit receiving a second program transmitted from the server, second link information corresponding to an untransmitted third program, and a release key for allowing the second program to be activated after the identification information has been verified by the server; and a controller making the storage unit store the second program, the second link information and the release key received from the server and changing the first link information displayed on the display unit to the second link information stored in the storage unit.

An information terminal device according to the seventh aspect of the present invention is characterized by comprising: a storage unit storing a first program, a plurality of second programs including a plurality of first link information; a display unit displaying first link information; a transmitter transmitting to the server identification information for identifying the first program, when the first link information is selected; a reception unit receiving a second program transmitted from the server after the identification information has been verified by the server, and a display controller selecting second link information for receiving a third program from the server from the storage unit and changing the first link information displayed on the display unit to the second link information.

An information terminal device according to the eighth aspect of the present invention is characterized by comprising: a storage unit storing a first program, first link information and a second program; a display unit displaying the first link information; a transmitter transmitting to the server identification information for identifying the second program stored in the storage unit, when the first link information is selected; a reception unit receiving a release key for allowing the predetermined second program transmitted from the server to be activated, second link information for requesting allowing a second program, which is different from the predetermined program, to be activated, after the identification information has been verified by the server; and a controller allowing access to the second program stored in the storage unit on the basis of the release key received from the server, and changing the first link information displayed on the display means to a second link information which corresponds to the corresponding second program.

The functions of each of the information terminal devices can be implemented as a program running on the information terminal device or a method of adding a subprogram to a program running on the information terminal device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiment of the invention, and together with the general description given above and the detailed description of the preferred embodiment given below, serve to explain the principles of the invention.

FIG. 1 is a view showing a schematic configuration of a network system to which the present invention is applied;

FIG. 2A and FIG. 2B are views illustrating a basic function according to the present invention;

FIG. 3 is a view showing a schematic configuration of an information terminal device according to a first embodiment of the present invention;

FIG. 12 is a view showing a schematic configuration of a server according to the fifth embodiment of the present invention;

FIG. 17 is a schematic configuration of a network system which is applied to an information terminal device according to a seventh embodiment of the present invention;

FIG. 21 shows a specific processing example in the eighth embodiment of the present invention;

FIG. 23 is a schematic configuration of a network system which is applied to an information terminal device according to a ninth embodiment of the present invention;

FIG. 26 is a schematic configuration of a network system which is applied to an information terminal device according to a tenth embodiment of the present invention;

FIG. 27 shows a specific processing example in the tenth embodiment of the present invention.

DETAILED DESCRIPTION OF THE INVENTION

Figure 4:
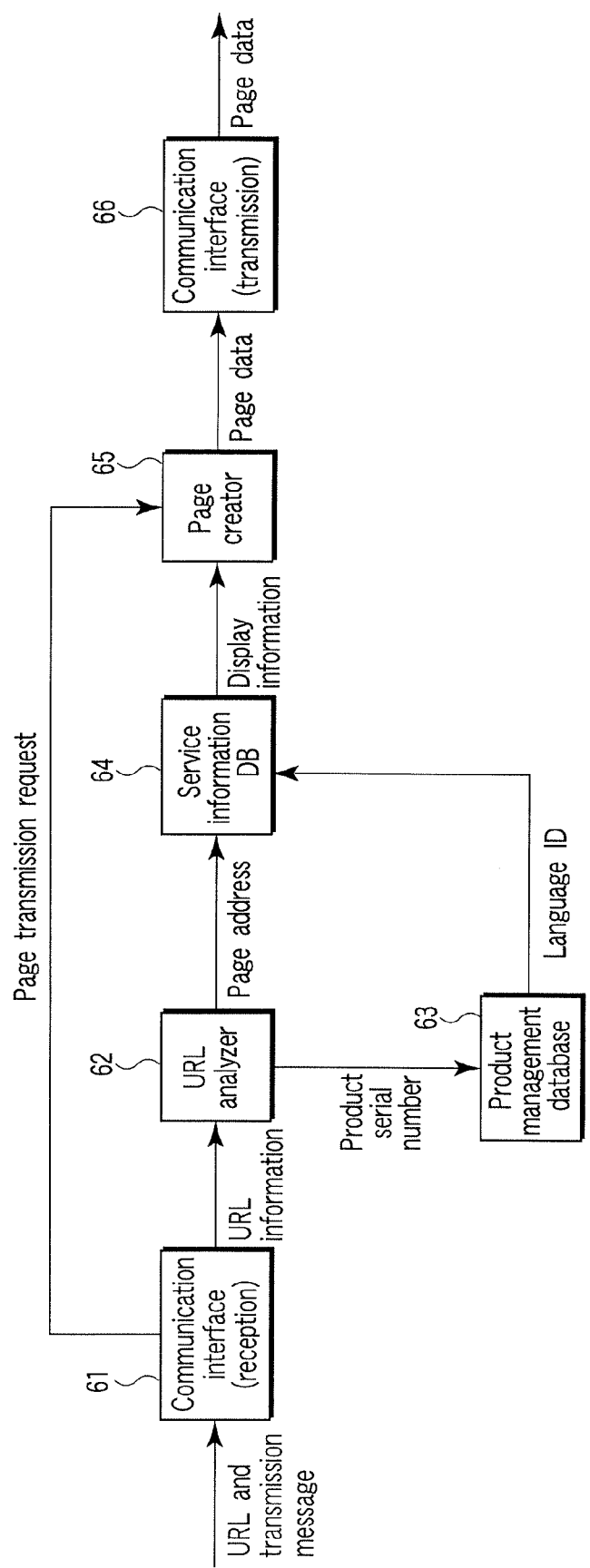
FIG. 4 is a view showing a schematic configuration of a server according to the first embodiment of the present invention.

Embodiments of the present invention will be described with reference to the accompanying drawings.

FIG. 1 is a view showing a schematic configuration of a network system to which the present invention is applied.

The network system to which the present invention is applied comprises a network 50 for connecting an information terminal device 10 (hereinafter, referred to as an "information terminal") and a server 60 to each other. The information terminal 10 comprises a peripheral device 40 for adding a variety of functions to the information terminal. In addition, the server 60 comprises a database 90 for supplying predetermined data to the information terminal 10.

In the configuration as described above, in the embodiments of the present invention, information from the server 60 is provided to the information terminal 10 in a predetermined language, and a technique for purchasing a program in a predetermined language is provided. Therefore, a home page address has been specified in a URL conventionally, and however, in the present invention, language information is added to the URL, whereby a home page can be displayed in a predetermined language and a program can be purchased based in a predetermined language. Specifically, this can be done as follows.

For example, conventionally, in the case of displaying a home page, an address of that home page is directly specified to display the home page having the address. As shown in FIG. 2A and FIG. 2B, if an address is specified in a format (domain name/directory/file name) of www.olympus.co.jp/service/etc/ (a file name is eliminated.), the home page matched with that address is displayed. In this case, instead of the domain name, an IP address may be assigned. The IP address is allocated to computers over a network. However, for a user (hereinafter, occasionally referred to as a "customer") of the information terminal 10, a language of the home page displayed by that address is not always a language currently displayed on the information terminal. That is, for example, even in the case where the home page is currently displayed in Japanese and the Japanese home page is present in the address specified home page, it is not identified whether or not the home page is displayed as a Japanese home page.

In one embodiment of the present invention, as shown in FIG. 2A, following a domain name (IP address), JP (Japanese) being a language ID of the currently displayed language is added to URL, that is, www.olympus.co.jp/sevice/etc.jsp?langid=JP is specified, whereby the home page in the information terminal 10 can be displayed in Japanese. In addition, even in the case where a program is purchased or a version is upgraded, when a program in multiple languages is provided as languages of the program, a user selects which language the program is downloaded after displaying the home page for downloading the program. In another embodiment of the invention, for example, as shown in FIG. 2B, if a product serial number is 12345, for example, www.olympus.co.jp/service/etc.jsp?serial=12345 is specified, and a language of the program according to the serial number is specified on the server side, whereby the program according to the specified language can be provided.

Now, specific embodiments of the present invention will be described here.

First Embodiment

Figure 5:
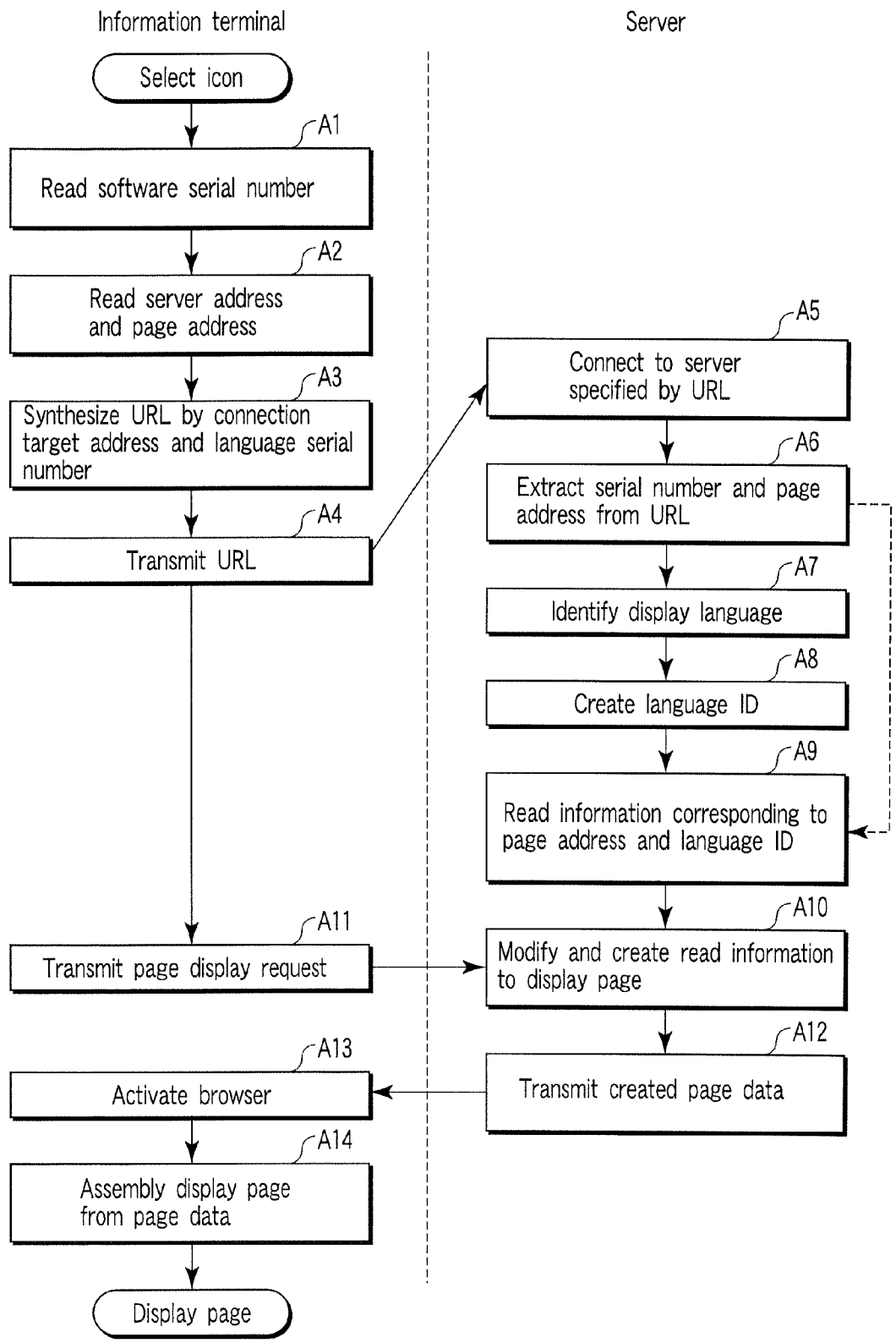
FIG. 5 is a flowchart showing an operation according to the first embodiment of the present invention.

A first embodiment will be described with reference to FIG. 3 to FIG. 5. FIG. 3 is a view showing a schematic configuration of an information terminal device 10 (hereinafter, referred to as an "information terminal") according to the first embodiment of the present invention. FIG. 4 is a view showing a schematic configuration of a server 60 according to the first embodiment of the present invention. FIG. 5 is a flowchart showing an operation according to the first embodiment of the present invention. The first embodiment shows an example in which, when application software is provided in a language by language basis, software upgrading is carried out in that language.

As shown in FIG. 3, the information terminal 10 comprises: a memory 11; a message reader 12; a display controller 13; a display 14; a pointing device 15; an input unit 16; a controller 17; an address synthesis unit 18; and a communication interface 19.

The memory 11 stores application software (hereinafter, referred to as "software"). The application software includes, for example, a program A (and an additional program B), an address database (DB), a serial number A, a message database (DB), a pattern image database (DB) or the like. The serial number A is a software serial number, i.e., a unique number assigned on the software by software basis. In addition, the message DB stores a message in a predetermined language (Japanese).

In addition, as shown in FIG. 4, the server 60 comprises: a reception communication interface 61; a URL analyzer 62; a product management database 63; a service information database (DB) 64; a page creator 65; and a transmission communication interface 66. The communication interfaces 61 and 66 may be configured single communication interface having transmission and reception function.

An operation of the information terminal 10 configured as described above and the server 60 will be briefly described. In the following description, as shown in FIG. 3, assume that two types of software are provided in the English and Japanese versions, and that the information terminal 10 uses the Japanese version.

The Japanese message for display in the message DB stored in the memory 11 is read out with the reader 12. The Japanese message read out with the reader 12 is sent to the display controller 13 together with a pattern image read out from the pattern image DB. Then, under the control of the display controller 13, the Japanese message is superimposed with the screen image, and is displayed on the display 14. In addition, the information displayed on the screen of the display 14 can be operated, for example, by selecting it by the pointing device 15, and the operated information is sent to the controller 17. The controller 17 reads out a software serial number from the memory 11 in addition to input of the operated information from the pointing device 15, and receives input data from the input unit 16. In addition, the controller 17 reads out and executes a program.

When the controller 17 reads out a serial number from the memory 11 based on an event generated by operation of the pointing device 15, the controller outputs this serial number to the address key code creator 18. Then, the controller outputs a transmission message to the communication interface 19. The address synthesis unit 18 adds the serial number to the server address and page address read out from the memory 11, and outputs it as a URL to the communication interface 19.

The communication interface 19 transmits the transmission message from the controller 17 and the URL from the address synthesis unit 118 to the server 60.

When a reception communication interface 61 of the server 60 receives the URL and transmission message from the information terminal 10, the interface outputs URL information to a URL analyzer 62. The URL analyzer 62 extracts a product serial number from the URL information, outputs it to a product management DB 63, and outputs the URL page address to a service information DB 64. The product management DB 63 extracts a language ID from the product serial number, and outputs it to the service information DB 64. The service information DB 64 generates display information based on the page address from the URL analyzer 62 and the language ID from the product management DB 63. In this case, the service information DB 64 generates display information according to a predetermined language based on the language ID. Then, in accordance with this display information and a page transmission request from the communication interface 61, a page creator 65 generates transmission page data, and transmits the page data from the transmission communication interface 66 to the information terminal 10.

The information terminal 10 receives the page data transmitted from the server 60 via a communication interface 19, and transmits a receiving message (additional program data if any) to the controller 17. The controller 17 outputs the receiving message to the display controller 13, and causes the display to display the receiving message (for example, web data or home page information). In addition, in the case where the communication interface 19 has received an additional program, the controller 17 stores the additional program in the memory 11.

An operation of the system configured as described above will be described with reference to FIG. 5.

First, an icon displayed on the display 14 is selected by the pointing device 15 or the like, whereby operation starts. When the icon is selected, the software serial number is read out from the memory 11 (step A1). Next, the address of the server 60 and the page address of a page in which the software is present in the server 60 are read out (step A2).

Then, URL is synthesized at the address key code creator 18 by using the address and serial number of a connection destination (step A3). Specifically, as shown in FIG. 2, a serial number is added to a general URL. Then, the synthesized URL is transmitted from the communication interface 19 to the server 60. In addition, a page display request signal is transmitted together with URL (step A11).

When connection to the server 60 specified by the URL specified by the information terminal 10 is established (step A5), the server 60 causes the URL analyzer to analyze the URL received via the communication interface 61, and extracts the serial number and page address from the URL (step A6). Then, a display language is identified from the serial number (step A7), and a language ID is generated (step A8). Next, information corresponding to the page address and language ID is read out from a service information DB 64 (step A9). Then, in accordance with a page display request (step A11), the information according to the step A9 is processed and generated so as to be page displayed (step A10).

When the page generated in the server 60 is transmitted to the information terminal 10, the terminal starts up a web browser (step A13). Then, in accordance with the transmitted page data, the display controller 13 constructs a display page (step A14), whereby the page is displayed on the display 14, and processing is terminated.

Figure 6:
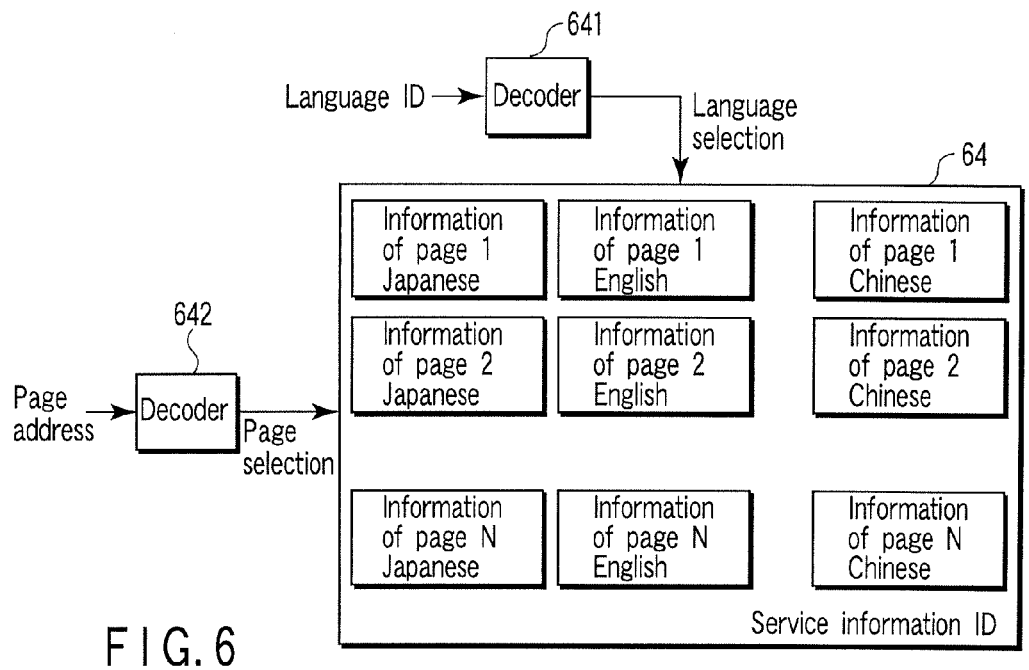
FIG. 6 is a view illustrating a method for selecting page information contained in service information database (DB)

The information contained in the service information DB 64 is selected in accordance with the method as shown in FIG. 6.

For example, the service information DB 64 has display information from page 1 to page N, and languages such as Japanese, English, . . . Chinese are provided for the information on page 1, which are the display information with the same contents. In the case where a language ID and a page address are inputted to the thus configured service information DB 64, the language ID and page address are inputted to a decoder 641 for language ID and a decoder 642 for page address, respectively. Then, the ID and address are converted into a signal for specifying a position on a DB by respective decoders. A signal for selecting a language (for example, a signal for selecting Japanese) is outputted from the decoder 641 for the language ID, and a signal for specifying a page (for example, a signal for selecting page 1) is outputted from the decoder 642. In accordance with these signals, for example, information of page 1 which is Japanese information is extracted from the service information DB 64, and is outputted to the page creator 65.

As described above, in the first embodiment, type of language displayed on the display 14 of the information terminal 10 is specified according to the software serial number, thus making it unnecessary for a user to select type of language displayed on the information terminal.

Second Embodiment

Figure 7:
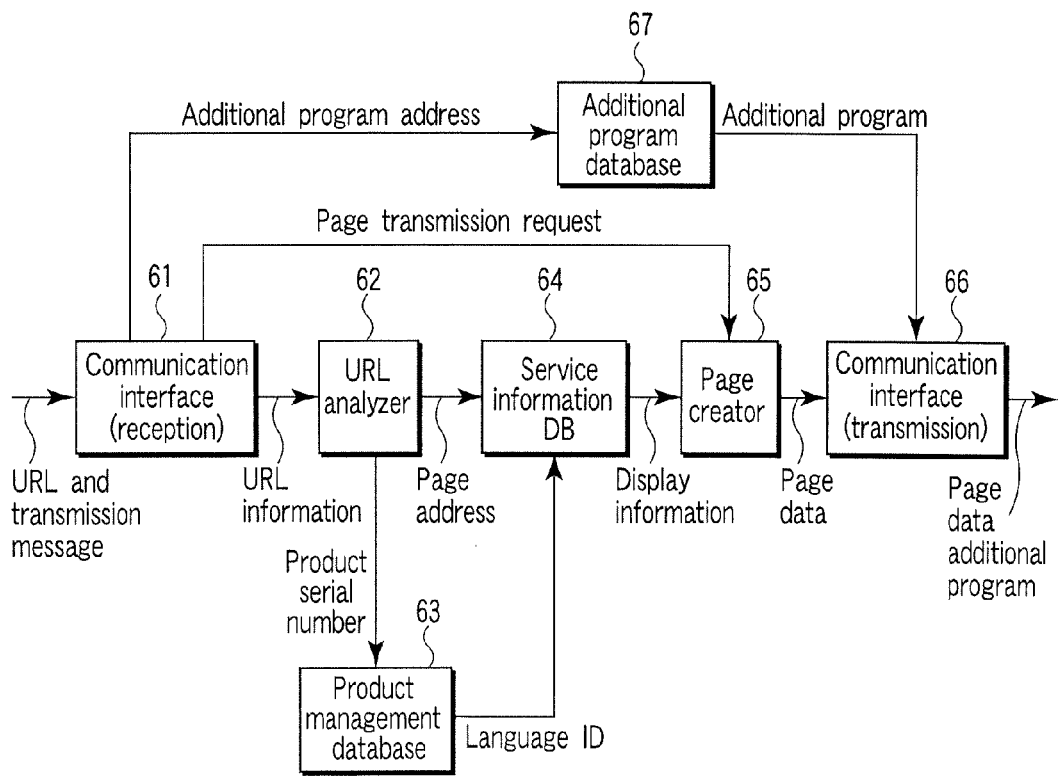
FIG. 7 is a view showing an example of configuration of a server when an additional program is added to an information terminal device.

In the above-mentioned first embodiment, a language ID is generated from a serial number, and a home page is displayed in accordance with the language ID. The second embodiment can be applied similarly when a program is added. FIG. 7 is a view showing an example of configuration of a server 60 when an additional program is added to an information terminal 10. In FIG. 7, like elements in FIG. 4 are designated by like reference numerals. A detailed description is omitted here. In addition, a configuration of the information terminal 10 is similar to that according to the first embodiment. An illustration and description are omitted here.

In FIG. 7, an additional program database (DB) 67 is added to the configuration of FIG. 4. Upon receiving a URL and transmission message from the information terminal 10, a reception communication interface 61 outputs an address of an additional program to the additional program DB 67. Then, the additional program DB 67 outputs the additional program extracted by the address to a transmission communication interface 66.

In such a case of the present embodiment, before transmitting an additional program, in general, user authentication is carried out by a user ID and password, for example. In the case where user authentication is normally carried out, for example, a release key is issued to make a program available. This flow of operation will be exemplified in a fifth embodiment, for example.

In the second embodiment, as described above, a language in accordance with a serial number is automatically displayed based on the serial number, as in the first embodiment. For an additional program, an additional program having a language used in an original program is automatically downloaded from an address of the additional program. This makes it unnecessary for a user to worry about a language to be displayed.

Third Embodiment

Figure 8:
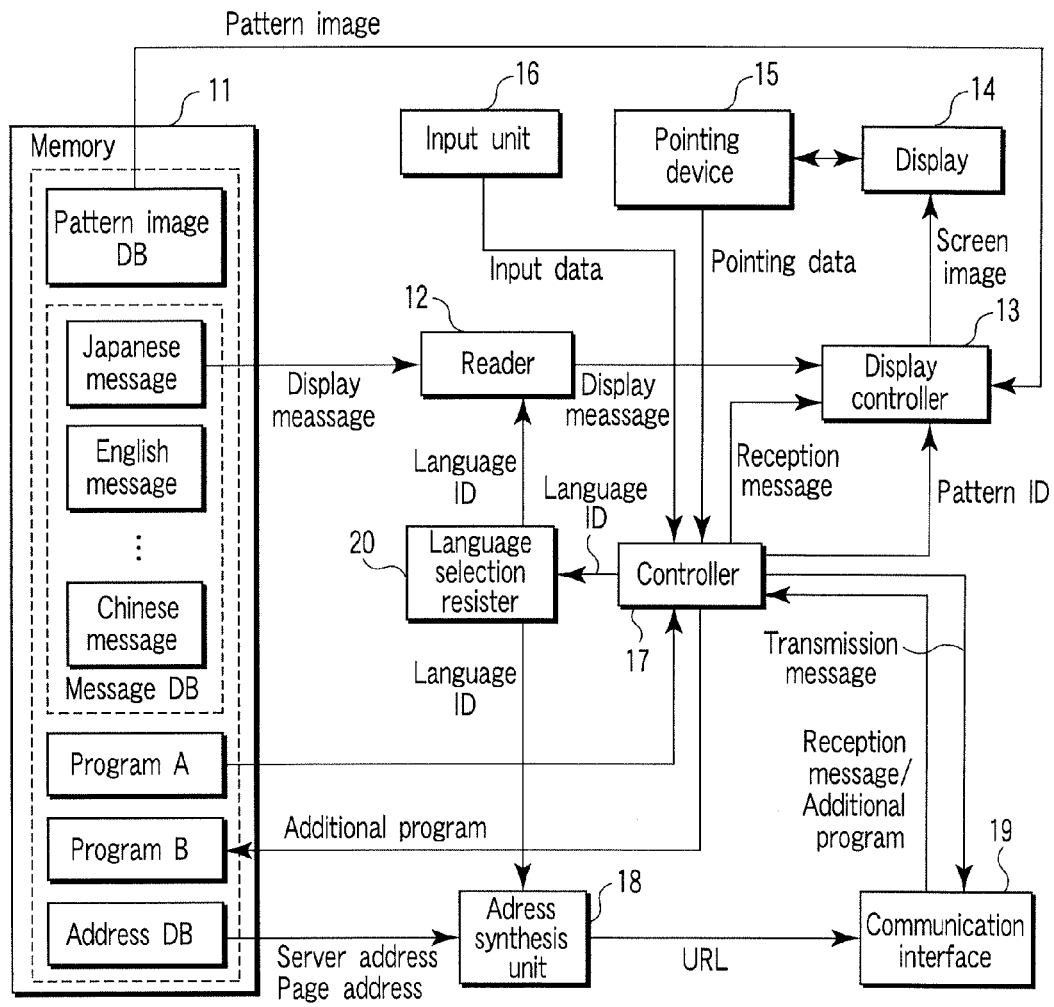
FIG. 8 is a view showing a schematic configuration of an information terminal device according to a third embodiment.
Figure 9:
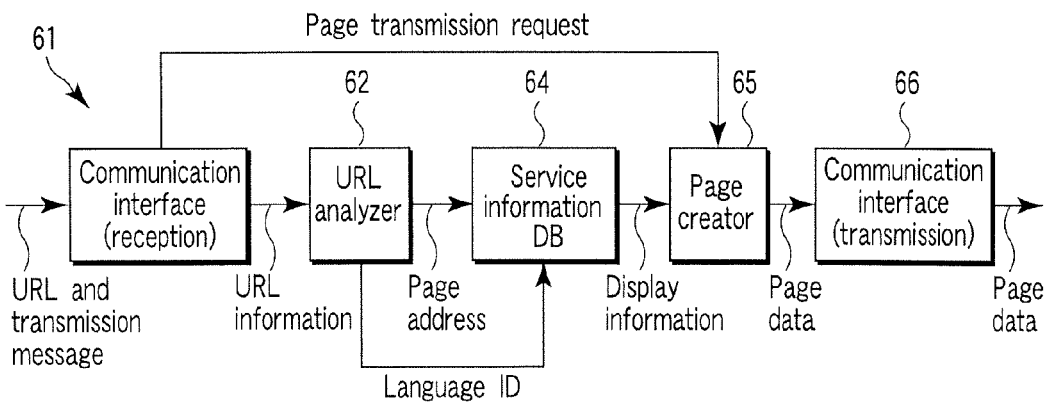
FIG. 9 is a view showing a schematic configuration of a server according to the third embodiment.

A third embodiment will be described with reference to FIG. 8 and FIG. 9. FIG. 8 is a view showing a schematic configuration of an information terminal 10 according to the third embodiment. FIG. 9 is a view showing a schematic configuration of a server 60 according to the third embodiment. In FIG. 8 and FIG. 9, like elements in FIG. 3 and FIG. 5 are designated by like reference numerals. A detailed description is omitted here.

In the third embodiment, software is provided on a multiple language basis, not on a language by language basis. Messages in a plurality of languages are included in a message DB stored in a memory 11. That is, in the third embodiment, a desired language in a display message is selected by a language ID in order to display a software language.

As shown in FIG. 8, a language selection register 20 is provided for the information terminal 10. In FIG. 8, the language selection register 20 registers a language ID from a controller 17. A reader 12 reads out from the memory 11 a message in a language corresponding to the language ID registered in the language selection register, and outputs a display message to a display controller 13. In addition, an address synthesis unit 18 synthesizes a URL obtained by adding the language ID read out from the language selection register 20 to a server address and a page address, and outputs it to a communication interface. Another operation of the information terminal 10 is identical to that according to the first embodiment. A duplicate description is omitted here.

FIG. 9 is a view showing a configuration of the server 60 according to the third embodiment. In FIG. 9, the product management DB 63 of FIG. 4 is omitted here. This is because, although the product management DB 63 has extracted a language ID from a product serial number in the first embodiment, when the URL analyzer 62 has analyzed a URL in the third embodiment, the language ID is extracted, and thus, a language of display information can be specified by the extracted language ID. Another configuration is identical to that according to the first embodiment. A duplicate description is omitted here.

In the present embodiment, although a program itself supports multiple languages, in this case as well, advantageous effect similar to that of the first embodiment can be achieved.

Fourth Embodiment

Figure 10:
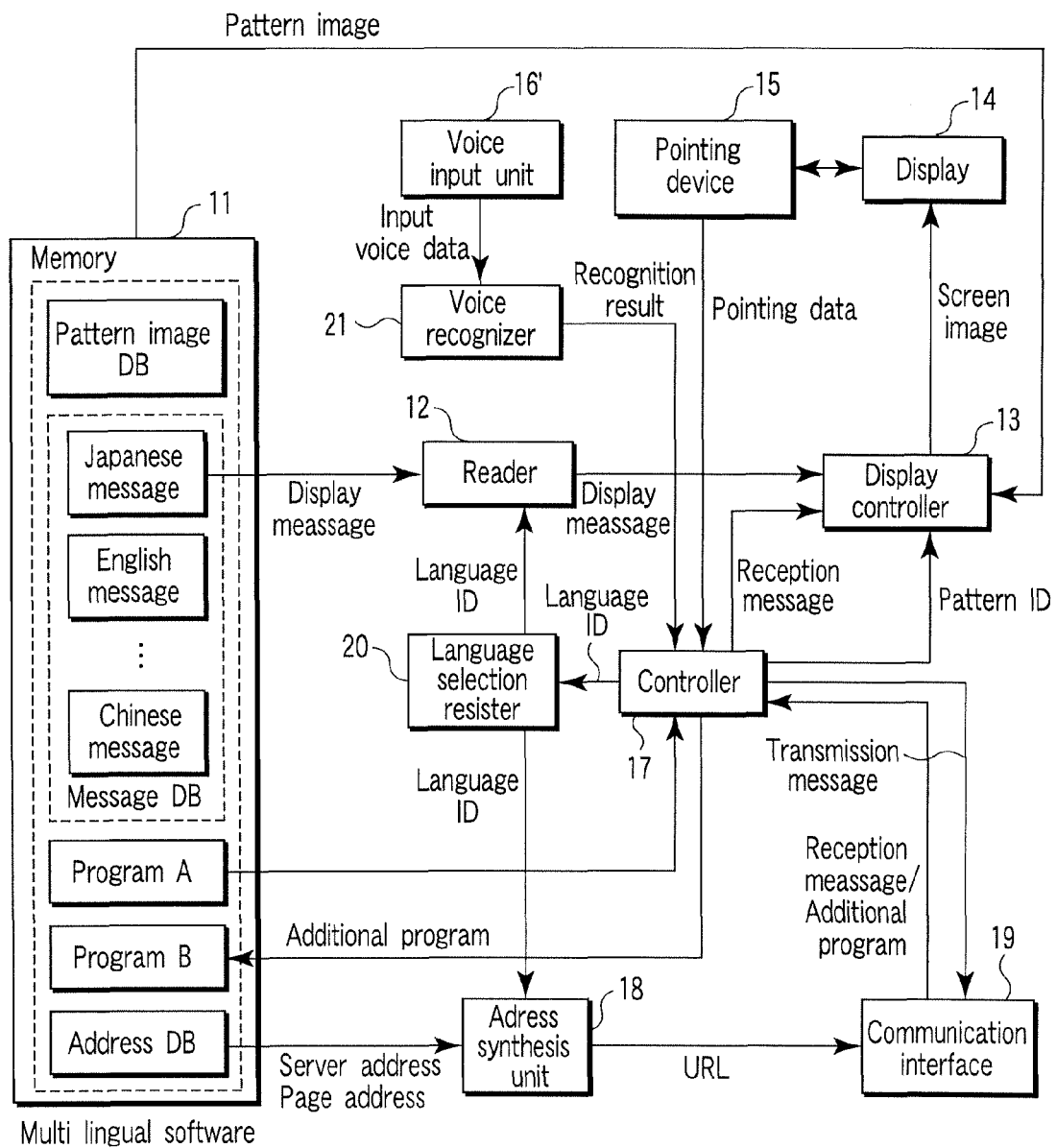
FIG. 10 is a view showing a schematic configuration of an information terminal device according to a fourth embodiment.

A fourth embodiment will be described with reference to FIG. 10. FIG. 10 is a view showing a schematic configuration of an information terminal 10 according to the fourth embodiment. In FIG. 10, like elements in FIG. 3 and FIG. 8 are designated by like reference numerals. A detailed description is omitted here.

FIG. 10 is a view showing an example of configuration of the information terminal 10 when voice recognition is carried out.

The information terminal 10 in FIG. 10 comprises a voice input unit 16' instead of an input unit 16 in FIG. 8, and comprises a voice recognizing portion 21 for recognizing a voice. The voice input unit 16' may be added as one aspect of the input unit 16. The voice inputted by the voice input unit 16' is inputted to the voice recognizing portion 21, and type of language according to the voice is recognized as Japanese or English and the like by the voice recognizing portion 21. Then, when this recognition result is inputted to a controller 17, the language ID is outputted from the controller 17 to a language selection register 20. In this manner, the language ID in accordance with a predetermined language is added to a URL. Another configuration is identical to that according to the third embodiment. A duplicate description is omitted here.

In the fourth embodiment, the user's use language is recognized by a voice, and thus, it is particularly effective in such a case of the information terminal with such a configuration that voice input is made.

Fifth Embodiment

Figure 11:
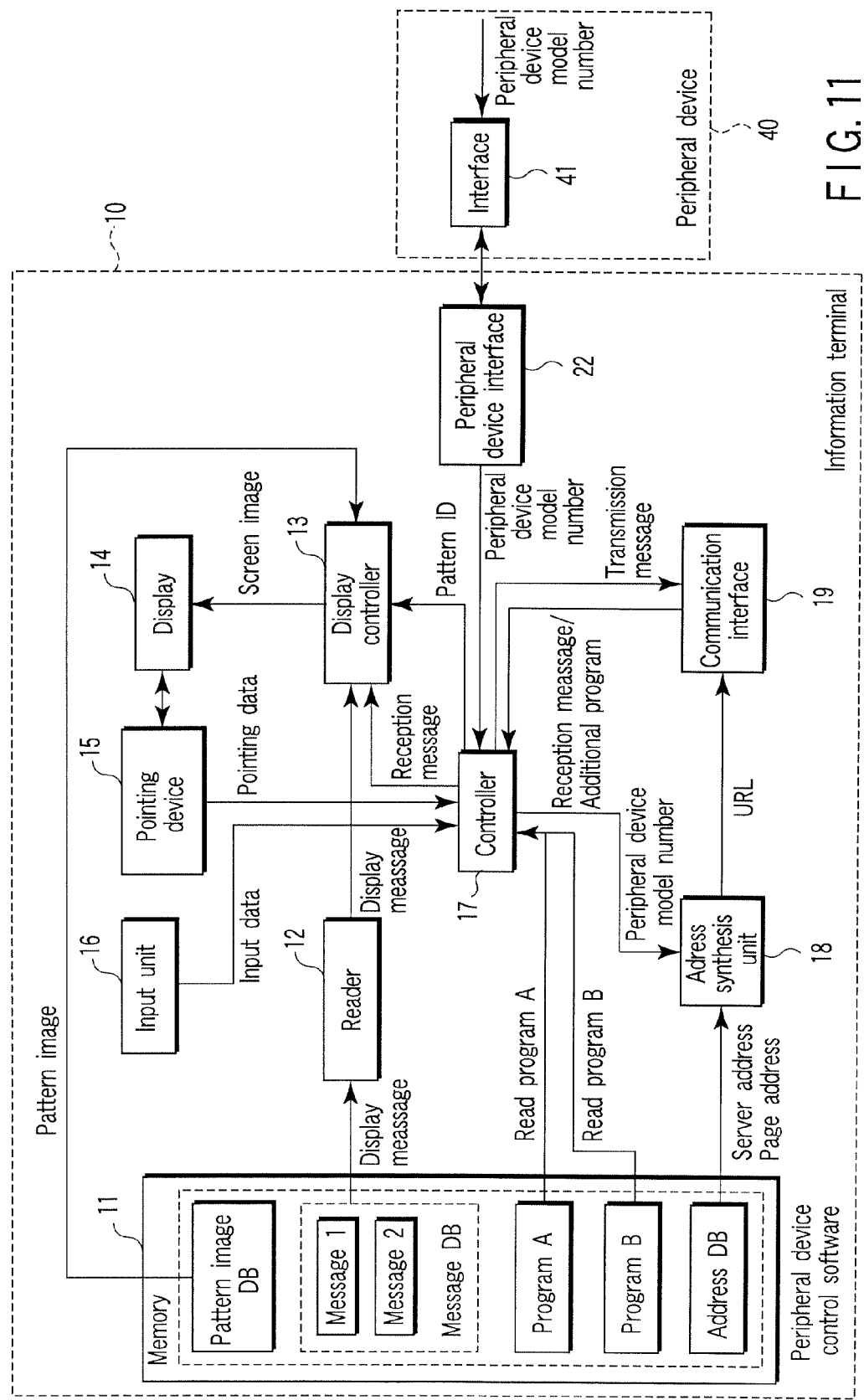
FIG. 11 is a view of a schematic configuration of an information terminal device according to a fifth embodiment of the present invention.
Figure 13:
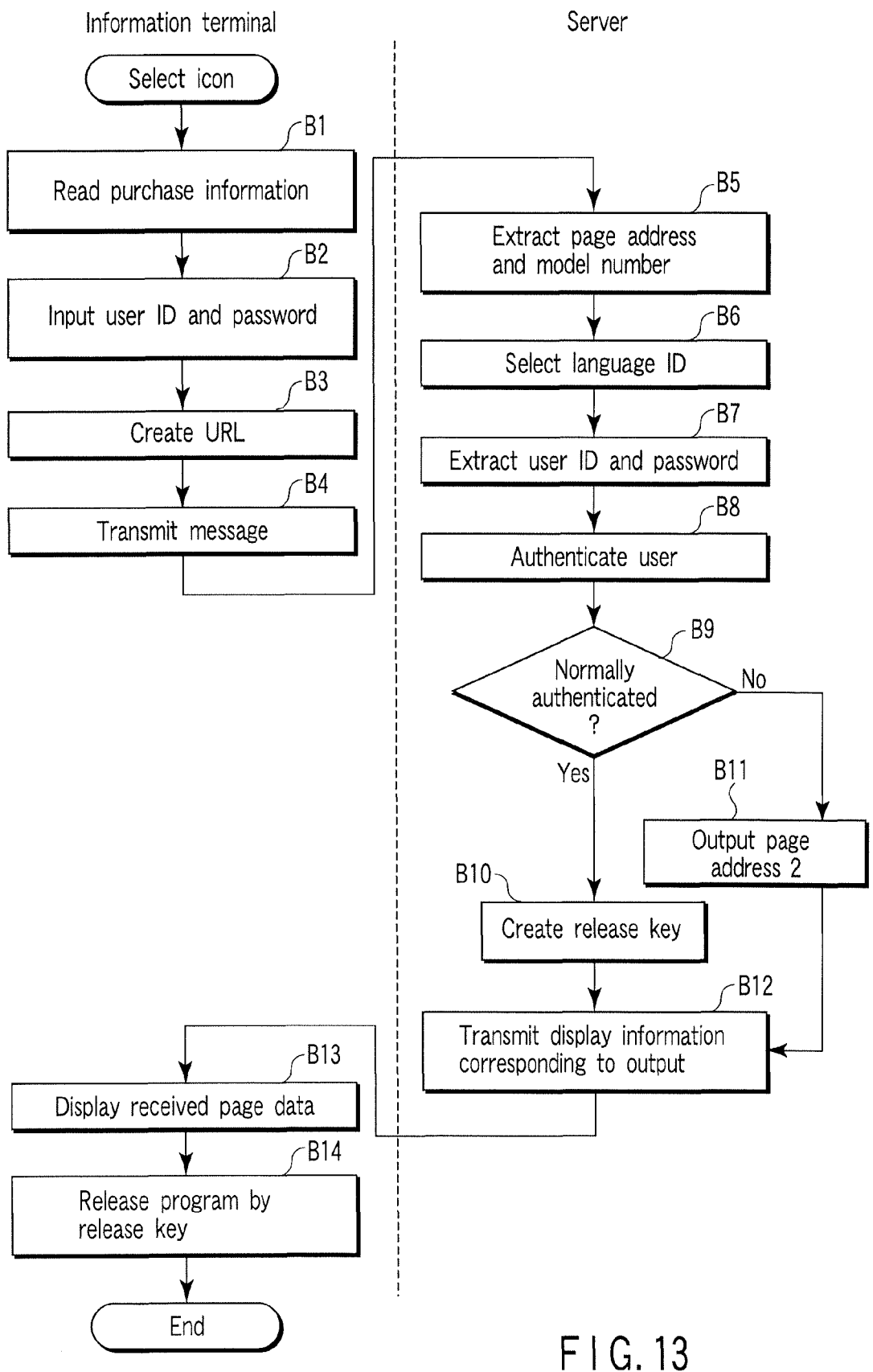
FIG. 13 is a flowchart showing an operation of the fifth embodiment of the present invention.

A fifth embodiment will be described with reference to FIG. 11 to FIG. 13. FIG. 11 is a view showing a schematic configuration of an information terminal device 10 according to the fifth embodiment of the present invention. FIG. 12 is a view showing a schematic configuration of a server 60 according to the fifth embodiment of the present invention. FIG. 13 is a flowchart showing an operation according to the fifth embodiment of the present invention. The fifth embodiment is an embodiment according to upgrading of control software of a peripheral device. In addition, in FIG. 11 to FIG. 13, like elements in FIG. 1 to FIG. 10 are designated by like reference numerals. A detailed description is omitted here.

As shown in FIG. 11, the information terminal 10 comprises a peripheral device interface 22 for making communication with a peripheral device 40. The peripheral device 40 comprises an interface 41 for making communication with the information terminal 10. The peripheral device 40 comprises a device number (model number) and serial number (manufacture number) or the like for each product.

As shown in FIG. 12, in addition to FIG. 4, the server 60 further comprises: a user ID/password extractor 68; a customer authentication unit 69; a customer management database (DB) 70; a page address selector 71; a key code creator 72; and a sales management database (DB) 73. The user ID/password extractor 68 extracts a user ID and a password from a transmission message, and outputs them to the customer authentication unit 69 and sales management DB 73. The customer authentication unit 69 carries out authentication of whether the target is an authorized user based on the user ID and password. In the case where the determination result is negative, a page address 2 is outputted to the page address selector 71. In addition, in the case where the determination result is affirmative, the customer authentication unit 69 requests the key code creator 72 to issue a release key. In addition, the key code creator 72 outputs information for generating the release key to the sales management DB 73. Then, the sales management DB 73 records the information for generating the release key together with a user ID. The page address selector 71 outputs the page address 2 in the case where the page address 2 is outputted from the customer authentication unit 69. Otherwise, this selector outputs a page address 1 outputted from a URL analyzer 62.

In this manner, the service information DB 64 outputs different display information according to the user authentication result. When URL information is analyzed, the URL analyzer 62 extracts a model number of the peripheral device 40 (or serial number. Hereinafter, referred to as only a model number), and the product management DB 63 outputs a language ID in accordance with the model number. Then, when display information is outputted from a service information DB 64, a language according to control software of the peripheral device 40 is selected in accordance with this language ID.

An operation of the system configured as described above will be described with reference to FIG. 13.

First, an icon displayed on a display 14 is selected by the pointing device 15 or the like, whereby operation starts. When the icon is selected, a predetermined purchase information display message is read out from the memory 11, and is displayed on a display 14 (step S1). In accordance with this message screen, a user inputs a user ID and a password for user authentication from an input unit 16 (step B2). This input data is outputted to a communication interface 19 via a controller 17. In addition, an address synthesis unit 18 inputs via the controller 17 a peripheral device model number read out from the peripheral device 40, and adds the model number to a server address and a page address read out from the memory 11, thereby generating a URL (step S3), and outputting the URL to the communication interface 19. The communication interface 19 transmits a transmission message to the server 60 with the URL being specified as an address (step B4).

A reception communication interface 61 of the server 60 having received a message from the information terminal 10 outputs URL information to a URL analyzer 62. The URL analyzer 62 extracts a model number and a page address 1 (step B5). The model number extracted by the URL analyzer 62 is outputted to a product management database 63 and a key code creator 72, a display language ID is selected from the product management database 63 based on the model number (step B6), and the selected ID is outputted to a service information DB 64.

On the other hand, a message is outputted from the reception communication interface 61 to a user ID/password extractor 68, and the user ID and password are extracted by a user ID/password extractor 68 (step B7). Based on the user ID and password extracted by the user ID/password extractor 68, a customer database (DB) 70 is referred to by the customer authentication unit 69, and user authentication is carried out (step B8). In the case where user authentication is normally carried out (Y of step B9), a customer authentication unit requests a key code creator 72 to issue a release key, and the key code creator 72 outputs the release key (step B10). This release key is recorded in a sales management database 73 together with the user ID. In the step B9, in the case where user authentication is not normally carried out, a page address 2 is outputted to a page address selector 71 (step B11).

Then, in the case where the page address selector 71 does not receive the page address 2 from the customer authentication unit 69, it is determined that user authentication is normally carried out, and the page address 1 is outputted. Otherwise, the page address 2 is outputted, indicating that authentication is not normally carried out. The service information DB 64 outputs predetermined display information to a page creator 65 in accordance with an output of a page address selector 71. Then, the page data generated by the page creator 65 is transmitted to the information terminal 10 via a transmission communication interface 66 (step B12).

The information terminal 10 displays received page data (step B13). In addition, a program is released by the received release key (step B14), and the program downloaded by the information terminal 10 can be used.

As described above, in the present embodiment, a model number is extracted, and a language ID is selected. Thus, there is no need for a user to specify an upgrading program having a language identical to the language used in a control program of a peripheral device, and such an upgrading program can be downloaded.

Sixth Embodiment

Figure 14:
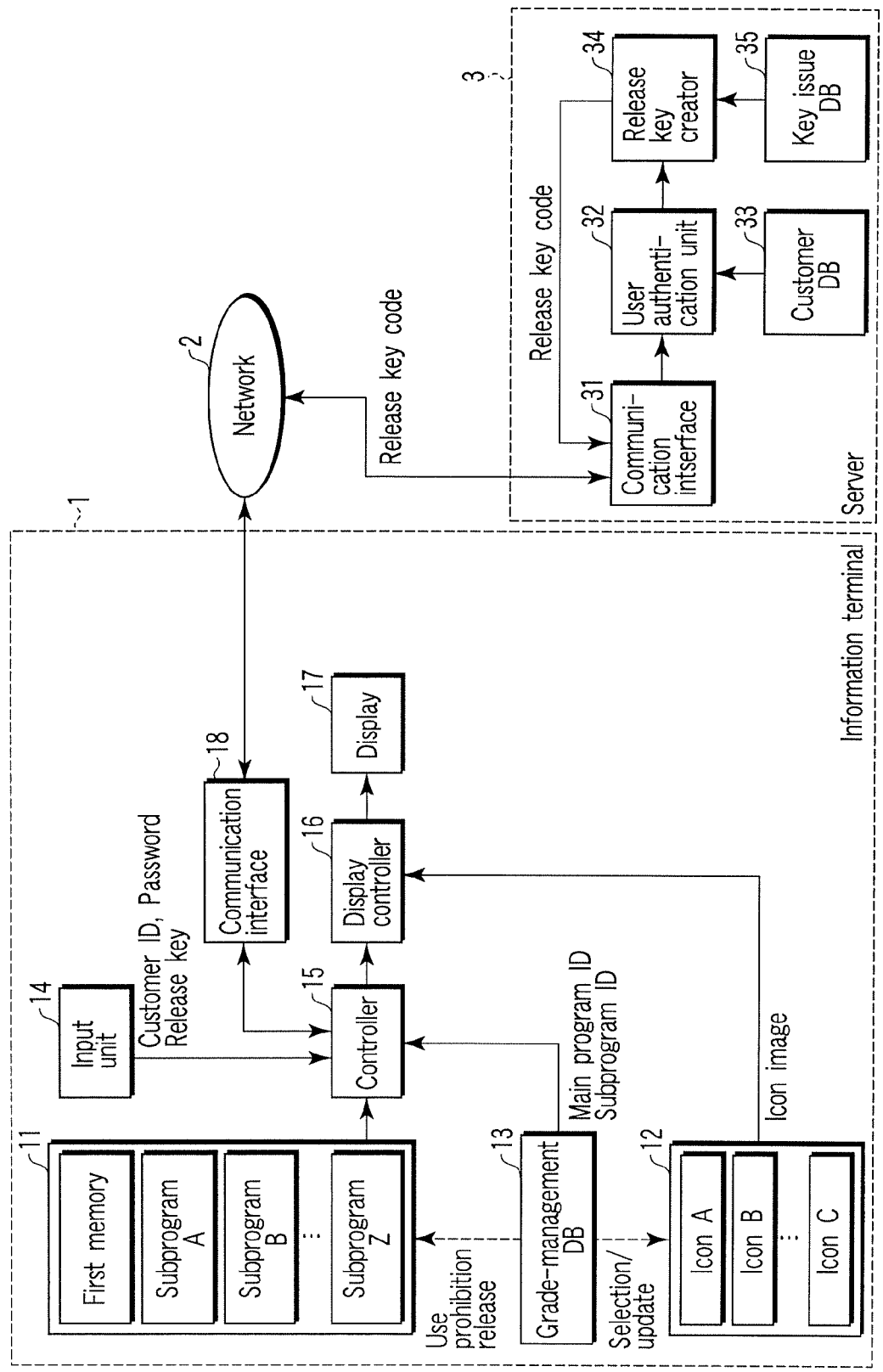
FIG. 14 is a schematic configuration of a network system which is applied to an information terminal device according to a sixth embodiment of the present invention.
Figure 15:
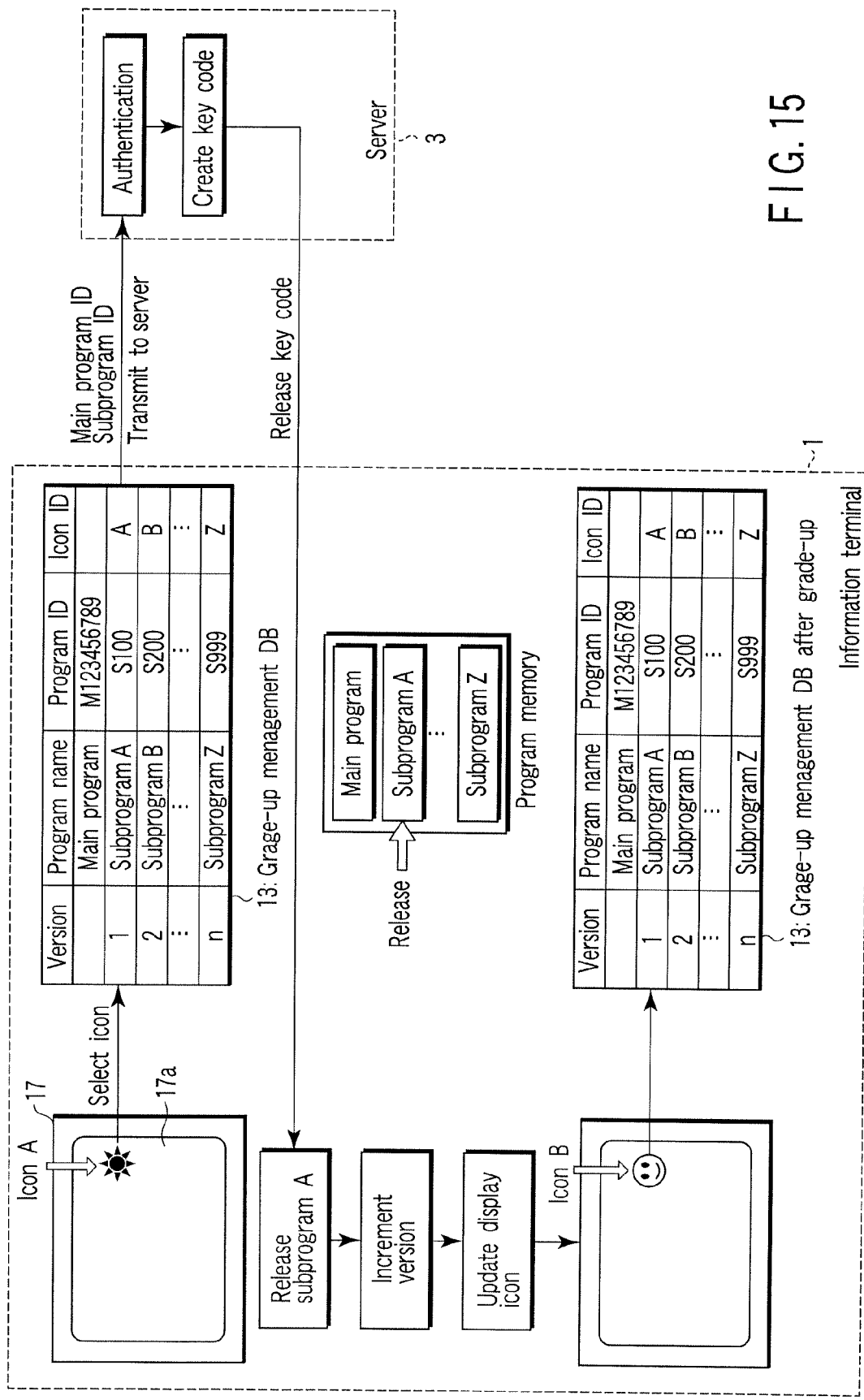
FIG. 15 shows a specific processing example in the sixth embodiment of the present invention.

The sixth embodiment will be described with reference to FIG. 14, FIG. 15 and FIG. 16. FIG. 14 is a schematic configuration of a network system which is applied to an information terminal device according to the sixth embodiment of the present invention. FIG. 15 shows a specific processing example in the sixth embodiment of the present invention.

Figure 16:
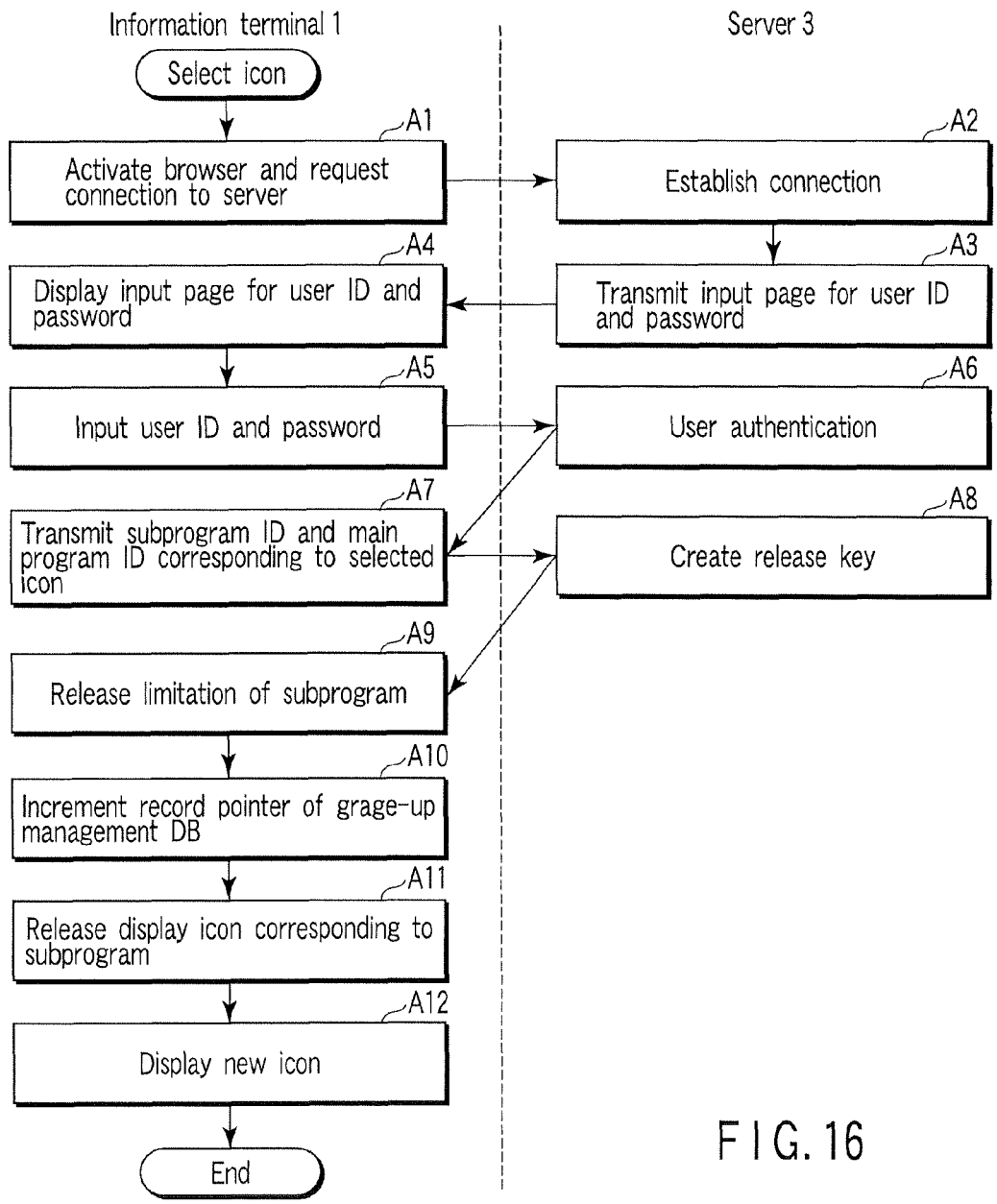
FIG. 16 is a flowchart illustrating the operation of the sixth embodiment of the present invention.

FIG. 16 is a flowchart illustrating the operation of the sixth embodiment of the present invention.

As shown in FIG. 14, the network system to which the present invention is applied has an information terminal device (hereinafter referred to as an information terminal) 1, a network 2, and a server 3.

The information terminal 1 according to the sixth embodiment, which is, for example, a personal computer (hereinafter referred to as PC) owned by a user, includes a first memory 11, a second memory 12, an upgrade management database (DB) 13, an input unit 14, a controller 15, a display controller 16, a display 17, and a communication interface 18.

The first memory 11 stores a main program and subprograms A through Z. The second memory 12 stores icons A through Z which correspond to the subprograms A through Z, respectively, which are stored in the first memory 11. The first and second memories 11 and 12, which are nonvolatile memories, external storage devices, such as magnetic disks, and so on, retain data even when the power to the information terminal 1 has been switched off. The upgrade management database 13 manages the upgrading states of the subprograms A through Z.

The input unit 14, which is an input device for the information terminal 1, such as a keyboard, a mouse, or the like, receives inputs from the user.

The controller 15 controls the overall operation of the information terminal 1.

The display controller 16 controls the display 17 so as to display various pieces of information.

Communication interface 18 communicates to the server 3 through the network 2 and other information terminal devices (not shown in the figure).

The network 2 may be of any configuration provided that it is compatible with mutual communications. The network 2 may be of any of networks compatible with mutual communications, such as internets, intranets, etc.

The server 3 includes a communications interface 31, a user authentication unit 32, a customer database (DB) 33, a release key creator 34, and a key issue database 35.

The communication interface 31 provides communications with another device (for example, the information terminal 1) connected to the network.

The user authentication unit 32 authenticates a user ID by comparison with user data in the customer DB 33 in order to determine right of access made by the user at the information terminal 1.

The release key creator 34 issues a release key to the user whose identity has been established by the user authentication unit 32 on the basis of data in the key issue database (DB) 35.

The operation of the network system thus configured will be described briefly with reference to FIG. 15.

First, if no additional function is used, only the main program can be run on the information terminal 1. Therefore, the icon A is displayed on the display screen 17a of the display 17 of the information terminal 1 to prompt the user to purchase the subprogram A. Let us suppose in this specification that the icon A functions as link information for upgrading the main program A. That is, each of the icons A through Z functions as an icon in which link information is embedded which makes available (or prompts the user to purchase) a corresponding respective one of the subprograms A through Z. In this specification, the acquisition of a release key for making available a subprogram will also be described as the purchase of a program. Suppose, for example, that the user clicks the mouse on the icon A to indicate his or her intention to purchase the subprogram A. Then, the program ID "S100" of the subprogram A corresponding to the icon A and the icon ID "A" are read from the upgrade management DB 13 and then transmitted to the server 3 together with the program ID "M123456789" of the main program and the user ID and password for identifying the user.

Upon receipt of the ID information in the communications interface 31, the server 3 determines whether or not the user has been duly registered in the user authentication unit 32. If the identity of the user has been established, the key code of the release key (hereinafter referred to simply as the release key) for the subprogram A is created in the release key creator 34 and then sent to the information terminal 1.

Based on the received release key, the information terminal 1 releases the subprogram A and makes it available, then increments a pointer indicating the version of the subprogram which is an object of purchase. To prompt the user to purchase the subprogram B prepared as the next version of the subprogram A, the icon B is displayed on the display 17 in place of the icon A.

The operation when the icon B is selected by clicking the mouse on it is the same as when the icon A is selected. After the subprogram B has been released, the icon C is displayed to prompt the user to purchase the subprogram C.

Reference is now made to the flowchart in FIG. 16 to describe the flow of processing when the user purchases a subprogram prepared in the information terminal 1.

First, when the on-screen icon (icon A in this example) is selected, a browser is activated to issue a request for connection to the server 3 (step A1). After connection to the server 3 has been established in response to this request (step A2), an entry page of user ID and password prepared in the server 3 is transmitted to the information terminal 1 (step A3).

Upon receipt of the entry page, the information terminal 1 displays it on the display 17 (step A4). The user enters the user ID and the password through the input unit 14 according to an entry request of the entry page (step A5). These data are transmitted to the server 3 for user authentication in the user authentication unit 32. When the identity of the user has been established, the server 3 requests the information terminal 1 to send the program ID "S100" of the subprogram A corresponding to the icon A and the program ID "M123456789" of the main program (step A6). If, on the other hand, the identity of the user has not been established in step A6, the server 3 notifies the information terminal 1 to that effect with a request for reentry of user information.

The information terminal 1 transmits the program ID of the subprogram A corresponding to the icon A and the program ID of the main program to the server 3 (step A7). Based on the received data, the server 3 creates a release key (step A8) and transmits it to the information terminal 1.

Upon receipt of the release key, the information terminal 1 releases the restriction of use of the subprogram A so that it becomes available on the information terminal (step A9). The record pointer in the upgrade management DB 13 is incremented (step A10).

The information terminal 1 erases the icon A displayed on the display 17 (step A11) and then displays the icon B on the display so as to prompt the user to purchase the subprogram B (step A12).

Thus, since the design of the icon as link information displayed on the display is updated each time the program is upgraded, it becomes easy to understand states of upgrading. Moreover, the program can be upgraded simply by selecting an icon, allowing ease of program upgrading.

Seventh Embodiment

Figure 18:
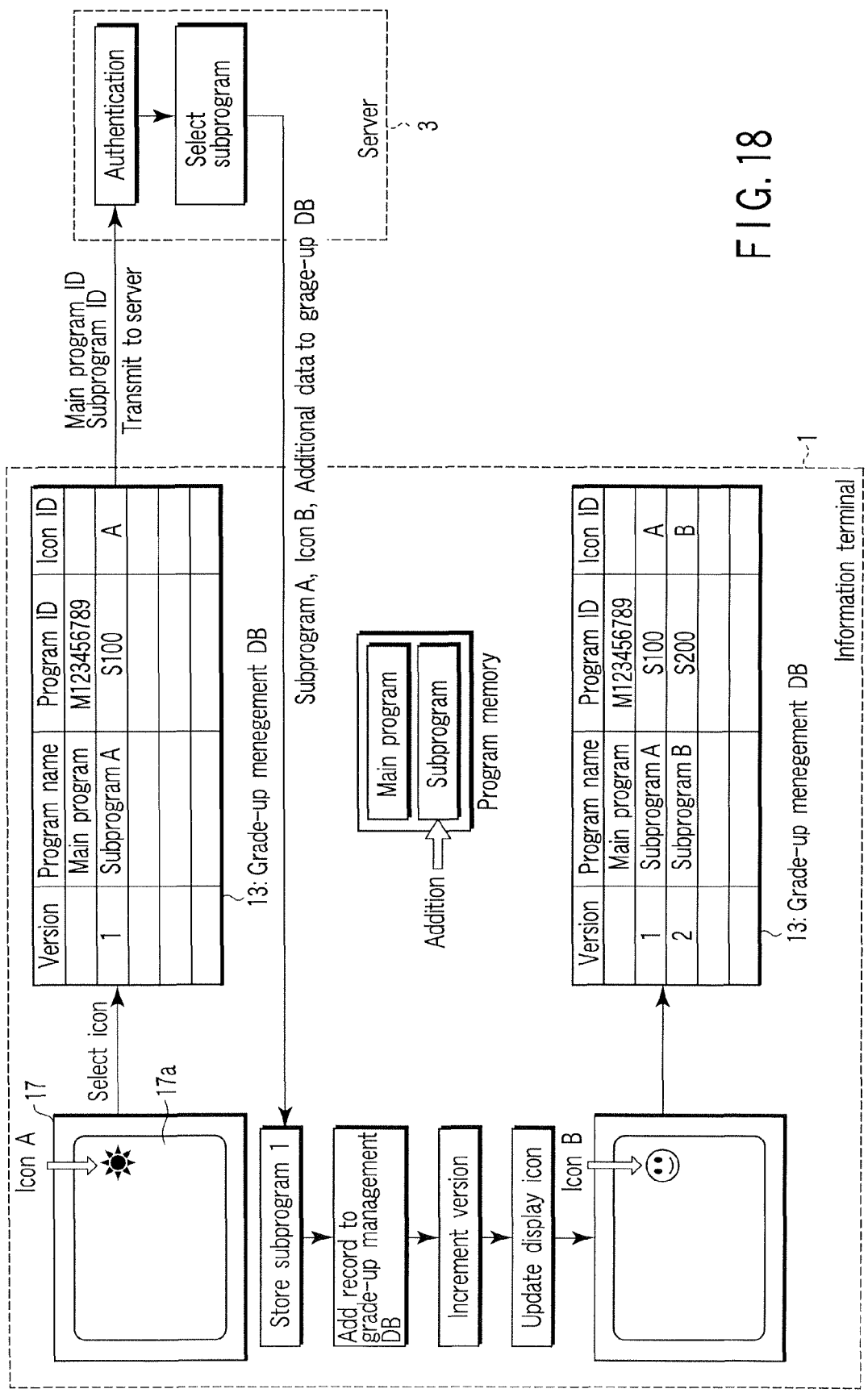
FIG. 18 shows a specific processing example in the seventh embodiment of the present invention.
Figure 19:
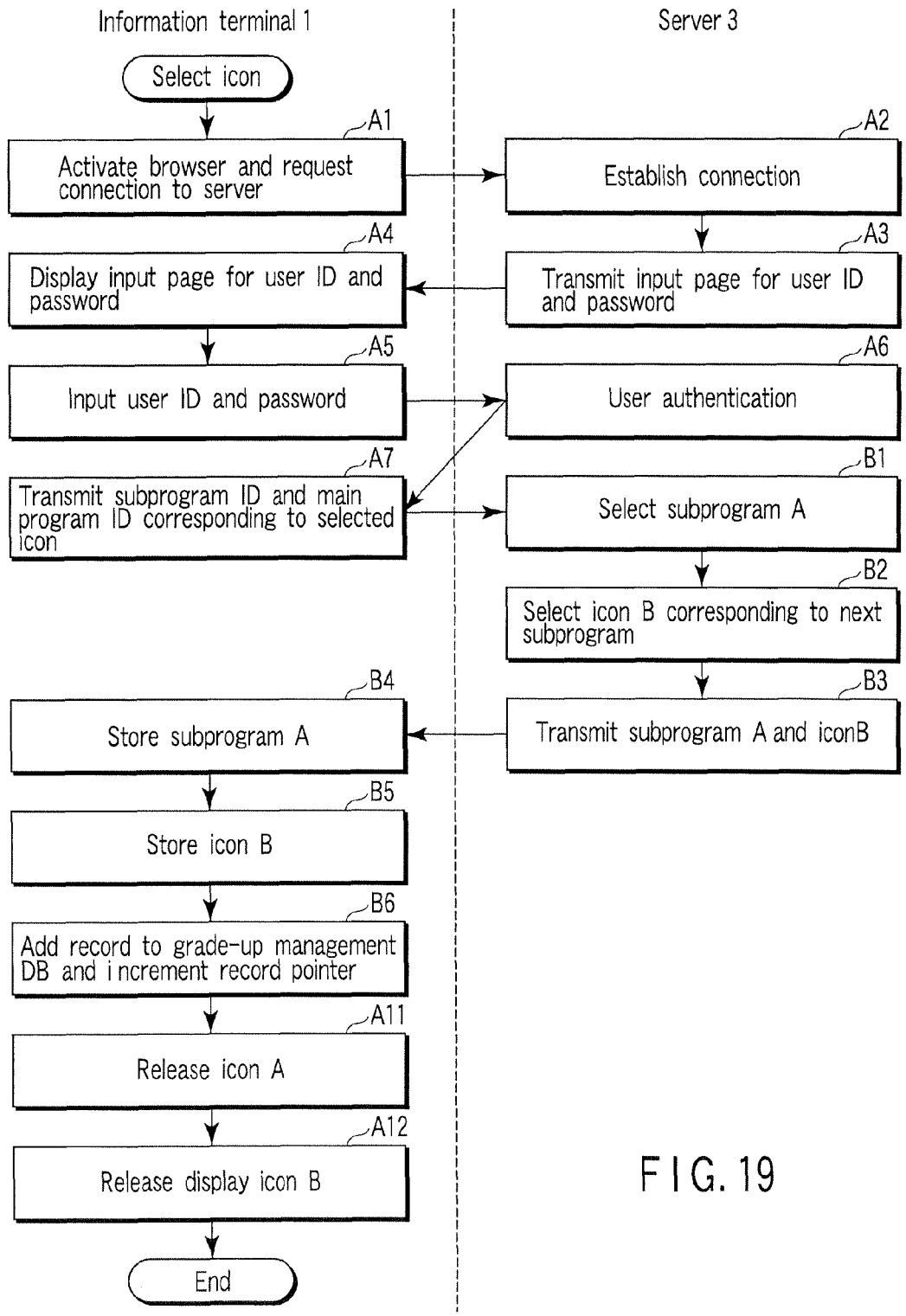
FIG. 19 is a flowchart illustrating the operation of the seventh embodiment of the present invention.

The seventh embodiment will be described with reference to FIG. 17, FIG. 18 and FIG. 19. FIG. 17 is a schematic configuration of a network system which is applied to an information terminal device according to the seventh embodiment of the present invention. FIG. 18 shows a specific processing example in the seventh embodiment of the present invention. FIG. 19 is a flowchart illustrating the operation of the seventh embodiment of the present invention. In FIG. 17, FIG. 18 and FIG. 19, corresponding parts to those in FIG. 14, FIG. 15 and FIG. 16 are denoted by like reference numerals and detailed descriptions thereof are omitted.

Unlike the sixth embodiment in which subprograms and icons have been prepared beforehand in the information terminal, in the seventh embodiment, both the subprograms and the icons have been prepared in the server and a subprogram and an icon are downloaded from the server into the information terminal each time the program is upgraded.

As shown in FIG. 17, although the information terminal 1 remains unchanged in basic configuration from that in FIG. 14, the server 3 is provided with a subprogram selector 36 and an icon selector 38 in place of the release key creator 34 shown in FIG. 14. Accordingly, a subprogram database (DB) 37 and an icon database (DB) 39 are provided in place of the key issue database 35.

In FIG. 17, the subprogram selector 36 selects and extracts a subprogram requested by the information terminal 1 from the subprogram DB 37. The icon selector 38 selects and extracts from the icon database 39 the icon corresponding to the subprogram B to be purchased next to the subprogram selected by the subprogram selector 36 and upgrade DB additional data.

The operation of the network system thus configured will be described with reference to FIG. 18.

As shown in FIG. 18, clicking on the icon A causes the program ID "S100" of the subprogram A associated with the icon A to be read. The program ID "M123456789" of the main program, the program ID of the subprogram A and the user ID and password for identifying the user are transmitted to the server 3. If the identity of the user has been established, the server 3 selects the subprogram A, the icon B to prompt the user to purchase the subprogram B and upgrade DB additional data on the basis of the program ID of the main program and the program ID of the subprogram A and then transmits them to the information terminal 1.

The information terminal 1 stores the subprogram A into the first memory 11, then adds a record for the subprogram B corresponding to the next version to the upgrade management DB 13 and enters the version number "2", the program name "subprogram B", the program ID "S200" and the icon ID "B" into that record. In addition, the pointer indicating the version is incremented and the display is changed from the icon A to the icon B associated with the subprogram B.

Reference is made to the flowchart in FIG. 19 to describe the flow of processing of purchasing a subprogram prepared in the server 3.

First, the processing from the step of selecting the icon to purchase the subprogram through the step of providing user authentication (from step A1 through step A6) remains unchanged from that in the sixth embodiment and description thereof is omitted. After the identity of the user has been established by the authentication in the server 3, the information terminal 1 transmits the program ID of the subprogram corresponding to the icon (for example, icon A) and the program ID of the main program (step A7). Upon receipt of these transmit data, the server selects a new subprogram (subprogram A) requested by the information terminal 1 (step B1) and then selects a new icon (icon B) corresponding to a subprogram (subprogram B) to be purchased next (step B2).

The server transmits the subprogram A, the icon B, and upgrade DB additional data to the information terminal 1 (step B3).

Upon receipt of the subprogram A and the icon B, the information terminal 1 stores the subprogram A into the first memory 11 (step B4), stores the icon B into the second memory 12 (step B5), and adds a record to the upgrade management DB and increments the record pointer (step B6).

The display controller 16 erases the icon A displayed on the display 17 (step A11) and displays the icon B on the display 17 so as to prompt the user to purchase the new subprogram B (step A12).

In the seventh embodiment, as described above, since a new subprogram is downloaded from the server 3 as necessary, there is no need of storing unnecessary subprograms in the information terminal 1. In the seventh embodiment, since a subprogram is downloaded at the time of purchase, there is no need of releasing the downloaded subprogram using the release key.

Eighth Embodiment

Figure 20:
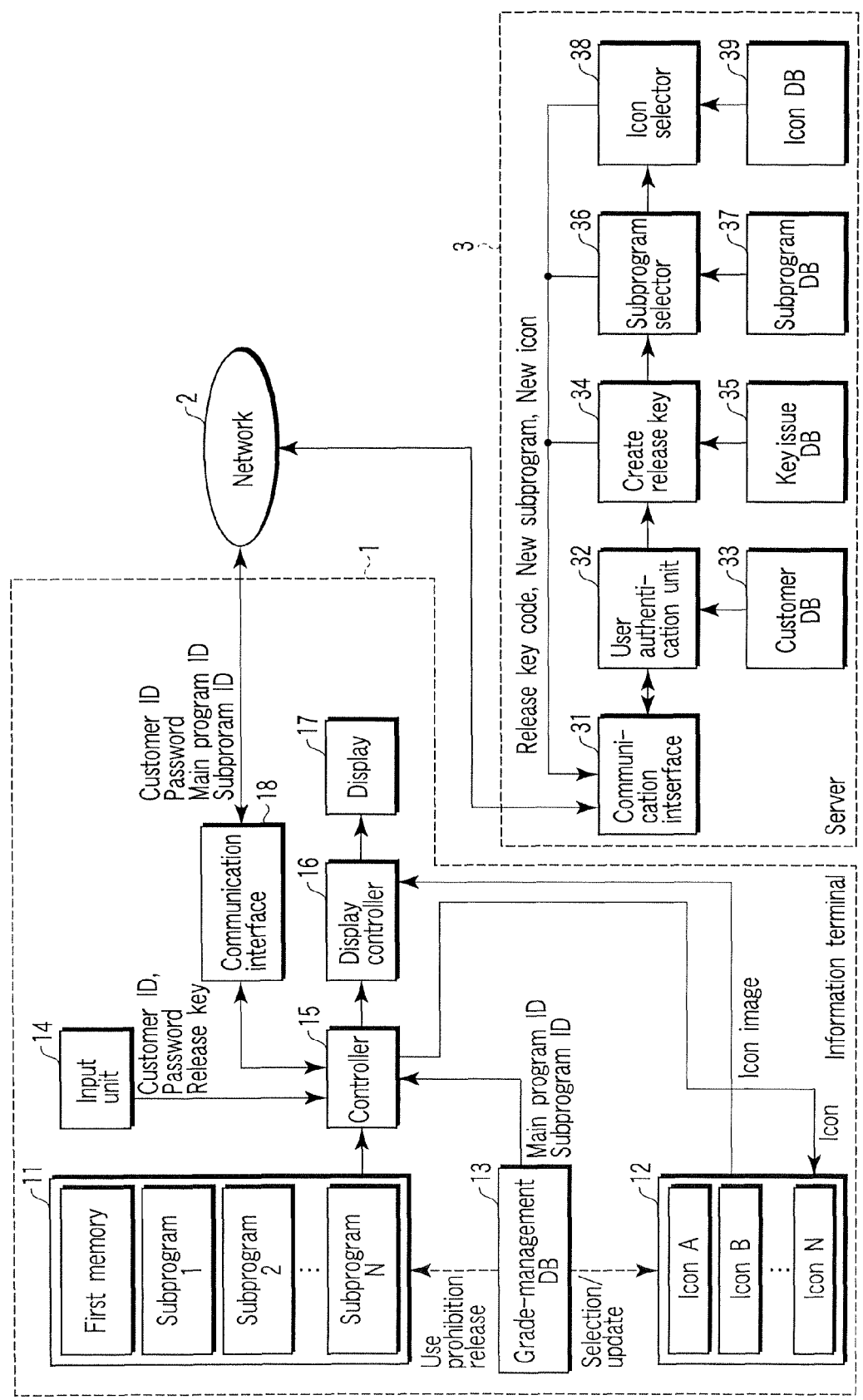
FIG. 20 is a schematic configuration of a network system which is applied to an information terminal device according to a eighth embodiment of the present invention.
Figure 22:
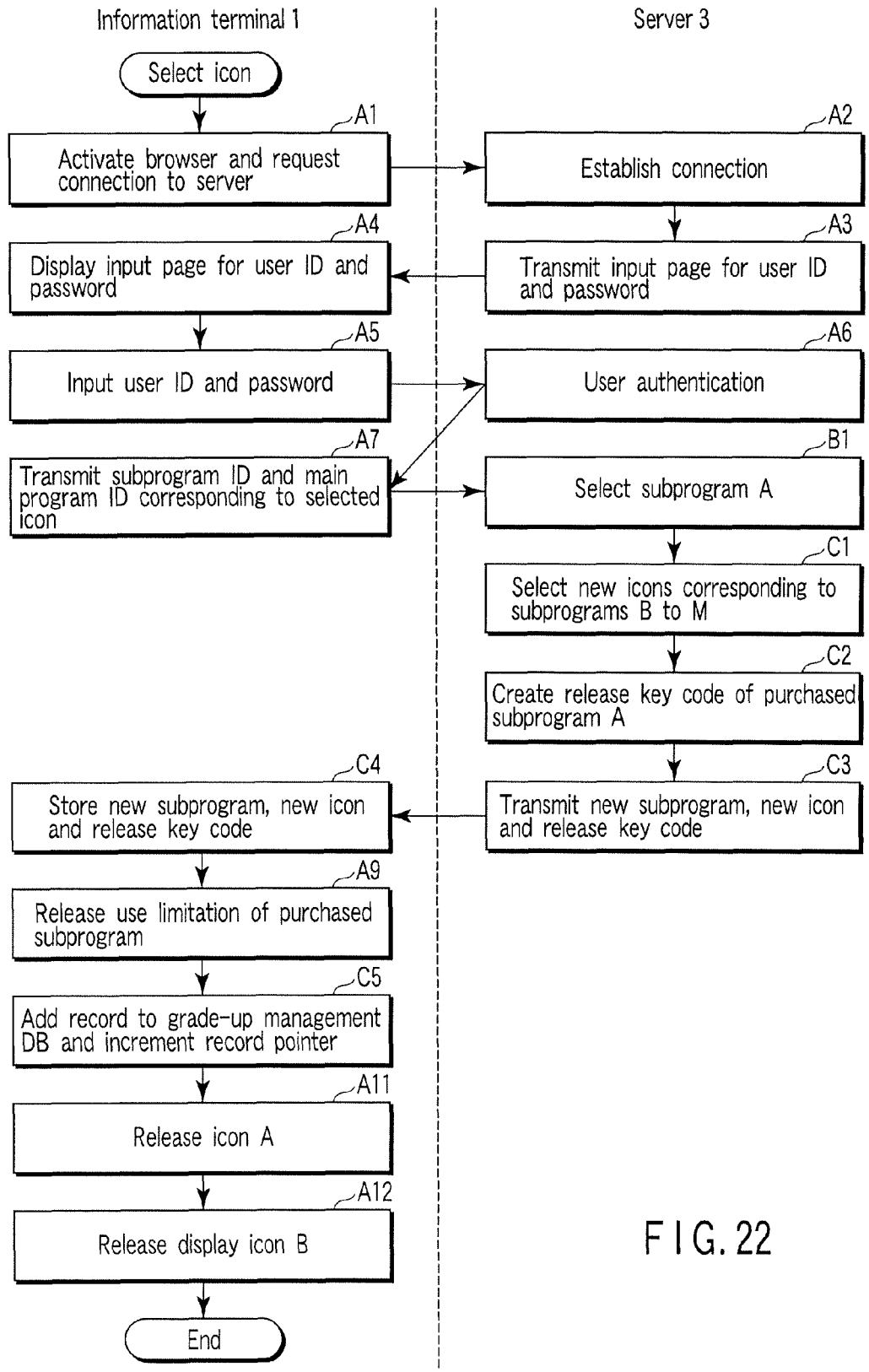
FIG. 22 is a flowchart illustrating the operation of the eighth embodiment of the present invention.

The eighth embodiment will be described with reference to FIG. 20, FIG. 21 and FIG. 22. FIG. 20 is a schematic configuration of a network system which is applied to an information terminal device according to the eighth embodiment of the present invention. FIG. 21 shows a specific processing example in the eighth embodiment of the present invention. FIG. 22 is a flowchart illustrating the operation of the eighth embodiment of the present invention. In FIG. 20, FIG. 21 and FIG. 22, corresponding parts to those in FIG. 14 through FIG. 19 are denoted by like reference numerals and detailed descriptions thereof are omitted.

The eighth embodiment, which is an extension of the seventh embodiment, is configured to download subprograms which will be purchased in future at the same time the subprogram A is downloaded. The information terminal 1 and the server 3 store subprograms and icons which are not released. Although the seventh embodiment is configured such that, each time an icon is selected, the subprogram corresponding to the selected icon and the icon corresponding to the next subprogram are sent to the information terminal 1, the eighth embodiment is configured such that two or more subprograms and two or more icons are transmitted in a single operation. The eighth embodiment will be described below more specifically.

As shown in FIG. 20, the eighth embodiment is a combination of the sixth embodiment of FIG. 14 and the seventh embodiment of FIG. 17. Thus, each component in the information terminal 1 and the server 3 is identical in function to the corresponding component in the first and seventh embodiments and hence description thereof is omitted.

The operation of the network system thus configured will be described with reference to FIG. 21.

As shown in FIG. 21, clicking on the icon A causes the program ID "S100" of the subprogram A associated with the icon A to be read. The program ID "M123456789" of the main program, the program ID "S100" of the subprogram A and the user ID and password for identifying the user are transmitted to the server 3. If the identity of the user has been established, the server 3 selects the subprogram A and issues a key for releasing the subprogram A on the basis of the data transmitted from the information terminal 1. The subprogram A, the icon B, the release key and upgrade DB additional data are sent from the server 3 to the information terminal 1. In addition, the subprograms B through M, the icons B through M and upgrading additional data therefor are also transmitted to the information terminal in expectation of future purchase of these subprograms.

The information terminal 1 stores the subprograms A through M into the memory and displays the release key for the subprogram A on the WEB browser on the display 17. The user enters the release key into application software to thereby release the subprogram A. Next, the upgrading DB additional data is added to the upgrade management DB 13. In this additional data, not only the subprogram A but also the subprograms B through M are batch-entered. In addition, the version pointer is incremented by one and the display icon is changed from the icon A to the icon B associated with the subprogram B in order to prompt the user to purchase the next subprogram B. When the user next selects the icon B to purchase the subprogram B, he or she simply obtains the release key only from the server 3 to make the subprogram B available as in the sixth embodiment because the subprogram B has been already stored in the information terminal 1.

Reference is next made to the flowchart of FIG. 22 to describe the flow of processing of purchasing a subprogram prepared in the information terminal 1.

First, the processing from the step of selecting an icon to purchase a subprogram through the step of providing user authentication (from step A1 through step A6) remains unchanged from that in the sixth embodiment and description thereof is omitted. After the identity of the user has been established by the user authentication in the server 3, the information terminal 1 transmits the program ID of a subprogram (for example, the subprogram A) corresponding to the icon (the icon A) and the program ID of the main program (step A7). Upon receipt of these transmit data, the server selects the subprogram (subprogram A) requested by the information terminal 1 (step B1) and moreover selects the subprograms B through M prepared for future purchase. The server further selects new icons (icons B through M) corresponding to the subprograms B through M (step C1). In the eighth embodiment, unlike the seventh embodiment, the subprograms and the icons are batch-transmitted to the information terminal; thus, the release key for the purchased subprogram A is created (step C2). The subprograms A through M, the icons B through M, the release key for the purchased subprogram A and additional data to add records corresponding to the subprograms B through M to the upgrade management DB are transmitted to the information terminal 1 (step C3).

The information terminal 1 stores the received new subprograms and the received new icons into the first memory 11 and the second memory 12, respectively (step C4). The restriction of use of the purchased subprogram A is released by the release key (step A9). Furthermore, the records are added to the upgrade management DB and the record pointer is incremented (step C5).

The display controller 16 erases the icon A displayed on the display 17 (step A10) and instead displays the icon B on the display 17 to prompt the user to purchase the subprogram B (step A11).

According to the eighth embodiment, as described above, when the user notifies the server of his or her intention to purchase a subprogram, two or more subprograms and two or more icons are concurrently transmitted to the information terminal. Thus, the batch transmission of two or more subprograms prepared in the server 3 at the time of purchase of a subprogram eliminates the need of transmitting a subprogram and an icon anew at each time the main program is upgraded although the amount of data transmitted to the information terminal at one time increases. For example, once a mobile terminal has been upgraded in a state of wired connection, the user will not suffer from stress even at the time of upgrading in a state of wireless connection where the transmission rate is lower.

Ninth Embodiment

Figure 24:
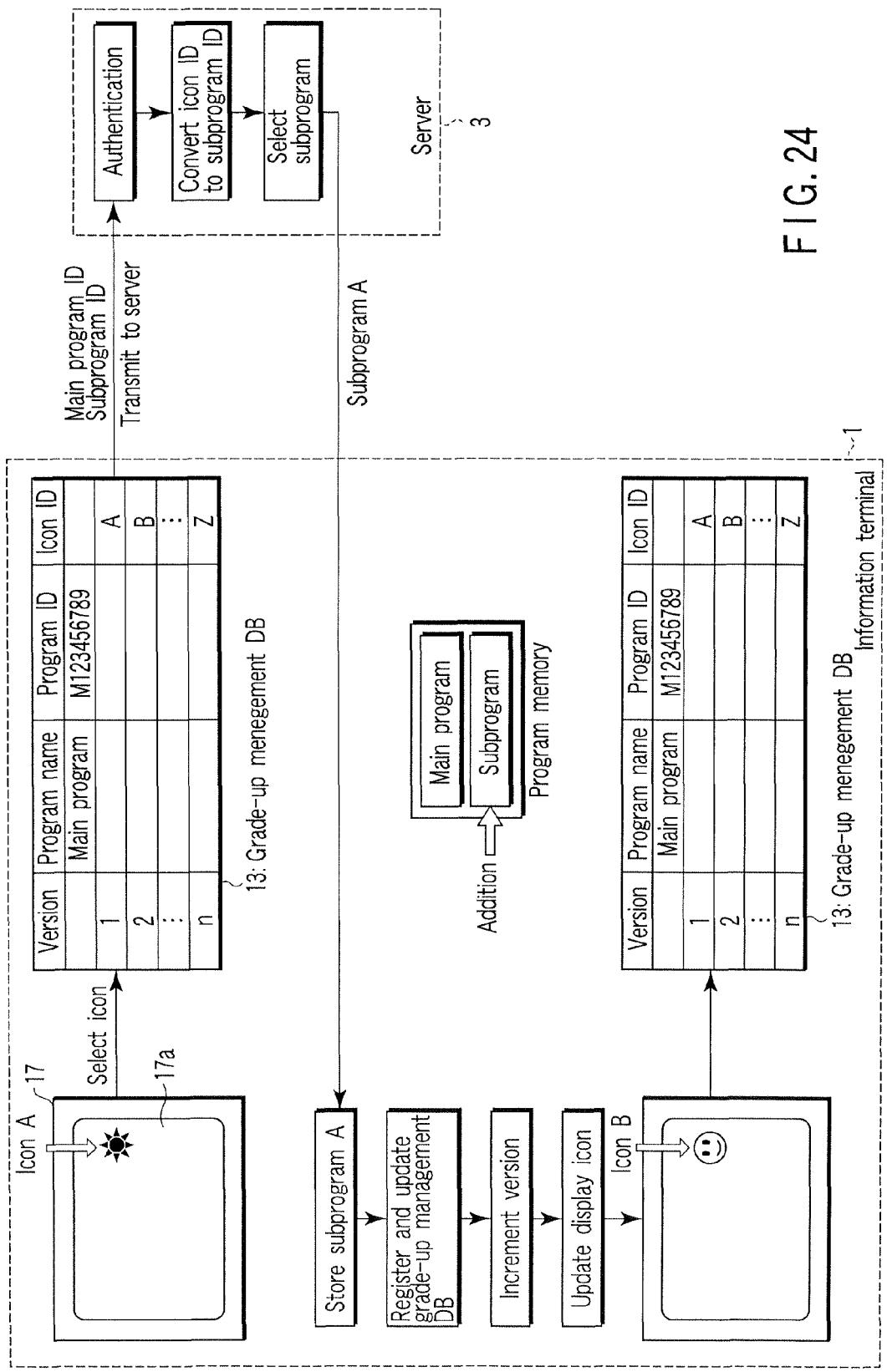
FIG. 24 shows a specific processing example in the ninth embodiment of the present invention.
Figure 25:
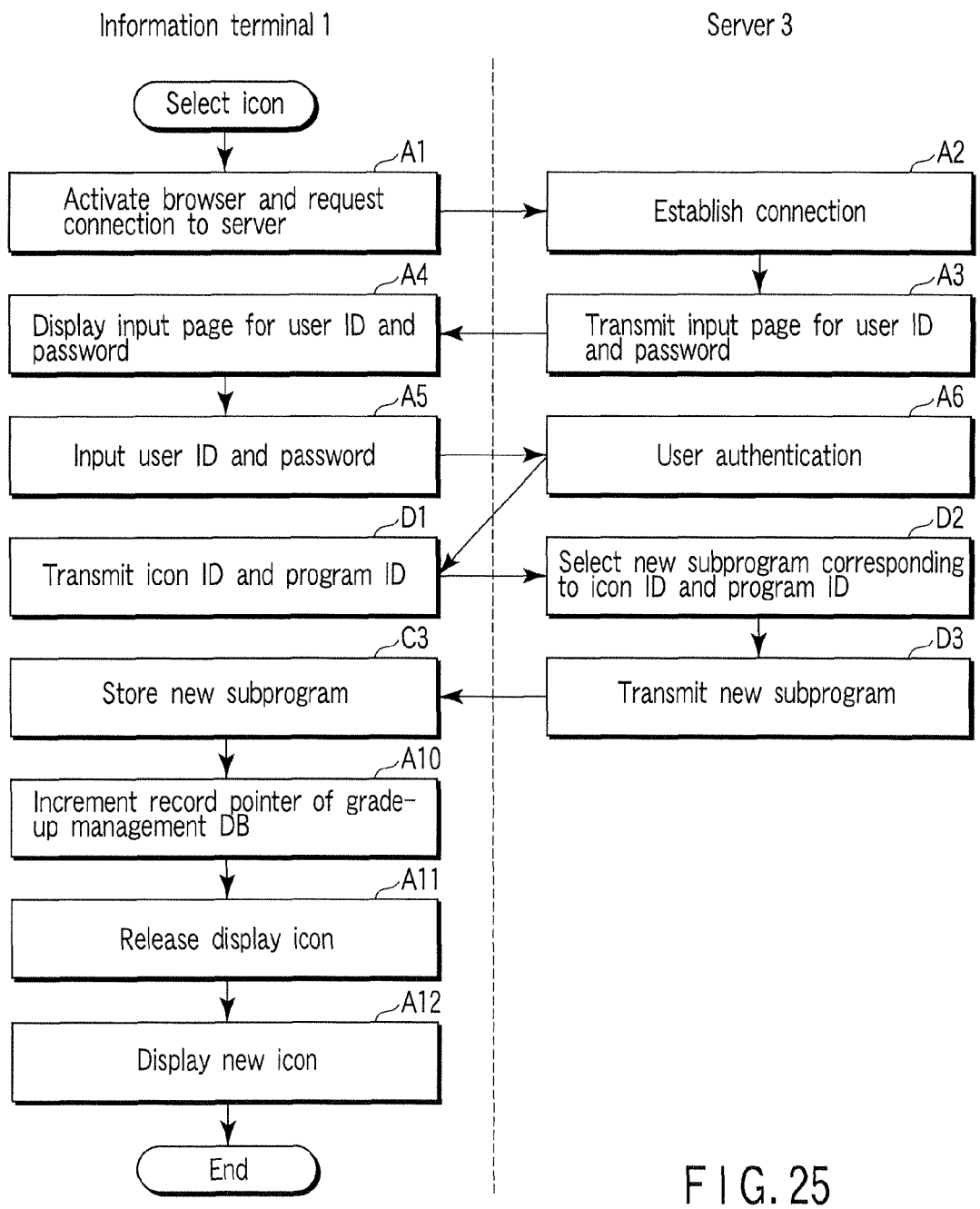
FIG. 25 is a flowchart illustrating the operation of the ninth embodiment of the present invention.

The ninth embodiment will be described with reference to FIG. 23, FIG. 24 and FIG. 25. FIG. 23 is a schematic configuration of a network system which is applied to an information terminal according to the ninth embodiment of the present invention. FIG. 24 shows a specific processing example in the ninth embodiment of the present invention. FIG. 25 is a flowchart illustrating the operation of the ninth embodiment of the present invention. In FIG. 23, FIG. 24 and FIG. 25, corresponding parts to those in FIG. 14 through FIG. 22 are denoted by like reference numerals and detailed descriptions thereof are omitted.

The ninth embodiment is a modification of the seventh embodiment configured such that only the icons have been prepared in the information terminal 1 and only the subprograms to be purchased are obtained from the server 3. Thus, although the information terminal 1 is identical in basic configuration to that in FIG. 17, the sever 3 is not provided with the icon selector 38 and the icon DB 39 as shown in FIG. 23.

The operation of the network system thus configured will be described with reference to FIG. 24.

As shown in FIG. 24, clicking on the icon A allows the program ID of the main program, the icon ID and the user ID and password for identifying the user to be transmitted to the server 3. If the identity of the user has been established, the server 3 specifies and selects the subprogram A on the basis of the program ID of the main program and the icon ID and sends it to the information terminal 1.

The information terminal 1 stores the subprogram A into the first memory 11 and enters a record for it into the upgrade management DB 13. The subprogram version indicating pointer is incremented and the display icon is changed to the icon B associated with the subprogram B so as to prompt the user to purchase it.

Referring to the flowchart of FIG. 25, a description is given of the flow of processing of purchasing a subprogram prepared in the server 3.

First, the processing from the step of selecting an icon to purchase a subprogram through the step of providing user authentication (from step A1 through step A6) remains unchanged from that in the sixth embodiment and description thereof is omitted. After the identity of the user has been established by the user authentication in the server 3, the information terminal 1 transmits the icon ID and the main program ID to the server 3 (step D1). Upon receipt of these transmit data, the server 3 selects a new subprogram (step D2) and sends it to the information terminal 1 (step D3). Upon receipt of the new subprogram, the information terminal 1 stores it into the first memory 11 (step C3). The record pointer in the upgrade management DB is incremented (step A10).

The display controller 16 erases the icon A displayed on the display 17 (step A11) and instead displays the icon B on the display 17 so as to prompt the user to purchase the subprogram B next (step A12).

Tenth Embodiment

Figure 28:
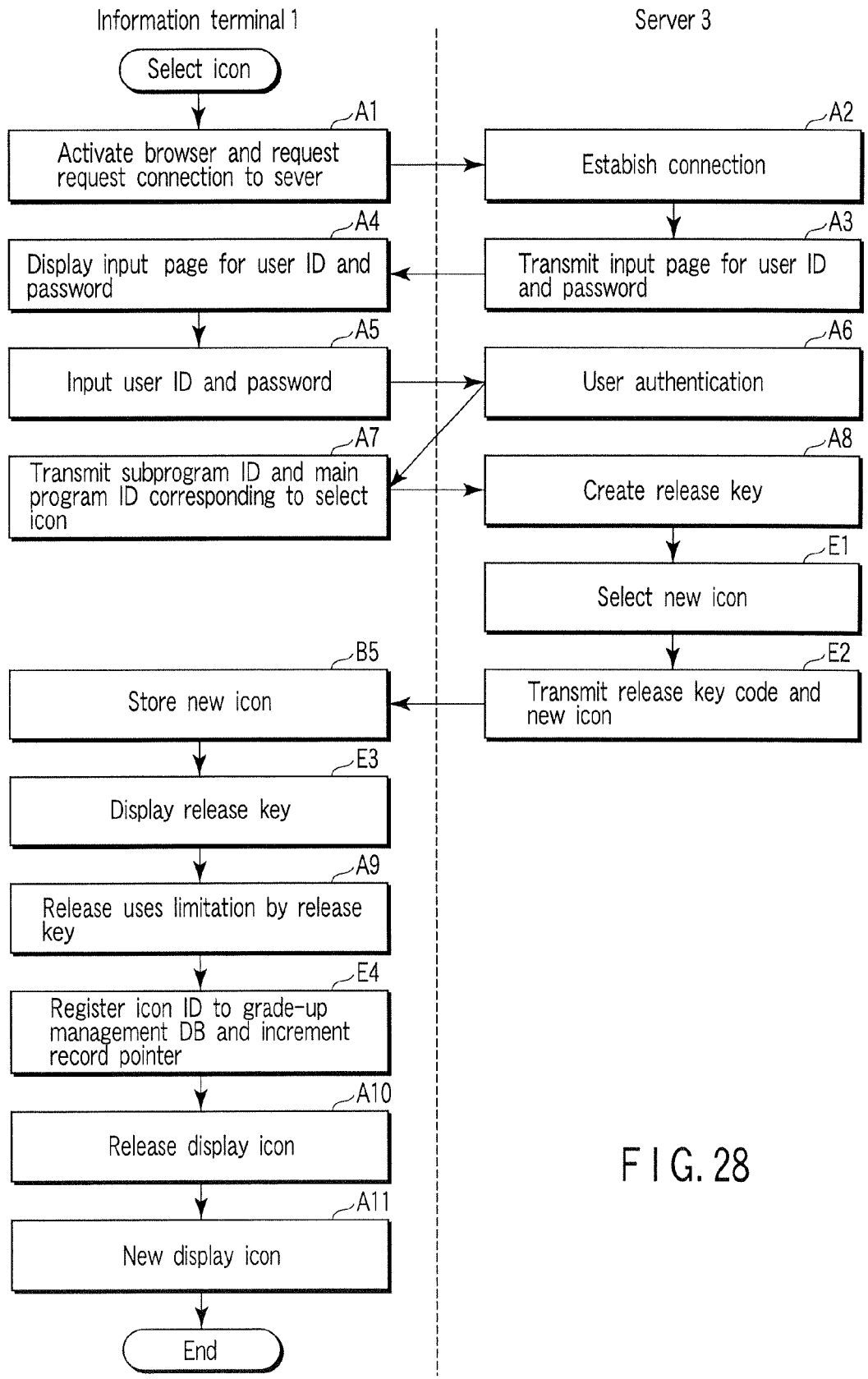
FIG. 28 is a flowchart illustrating the operation of the tenth embodiment of the present invention.

The tenth embodiment will be described with reference to FIG. 26, FIG. 27 and FIG. 28. FIG. 26 is a schematic configuration of a network system which is applied to an information terminal according to the tenth embodiment of the present invention. FIG. 27 shows a specific processing example in the tenth embodiment of the present invention. FIG. 28 is a flowchart illustrating the operation of the tenth embodiment of the present invention. In FIG. 26, FIG. 27 and FIG. 28, corresponding parts to those in FIG. 14 through FIG. 25 are denoted by like reference numerals and detailed descriptions thereof are omitted.

The tenth embodiment is a modification of the seventh embodiment configured such that subprograms have been prepared in the information terminal 1 and icons corresponding to upgrading subprograms other than the subprogram to be purchased first are obtained from the server 3. Thus, although the information terminal 1 is identical in basic configuration to that in FIG. 17, the sever 3 is configured so as not to have the subprogram selector 36 and the subprogram DB 37 as shown in FIG. 26.

The operation of the network system thus configured will be described with reference to FIG. 27.

As shown in FIG. 27, clicking on the icon A allows the program ID of the subprogram A to be read. The program ID "M123456789" of the main program, the program ID "S100" of the subprogram A and the user ID and password for identifying the user are transmitted to the server 3. If the identity of the user has been established, the server 3 creates a release key for purchasing the subprogram A on the basis of the program ID of the main program and the subprogram ID and selects the icon B for purchasing the subprogram B. The server 3 then sends the release key for the subprogram A and the icon B to the information terminal 1.

The information terminal 1, upon receiving the release key, releases the subprogram A, stores the icon B, increments the version pointer, and changes the display icon from the icon A to the icon B associated with the subprogram B so as to prompt the user to purchase it next.

Referring to the flowchart of FIG. 28, a description is given of the flow of processing of purchasing a subprogram prepared in the information terminal 1.

First, the processing from the step of selecting an icon to purchase a subprogram through the step of providing user authentication (from step A1 through step A6) remains unchanged from that in the sixth embodiment and description thereof is omitted. After the identity of the user has been established by the user authentication in the server 3, the information terminal 1 transmits the program ID of the subprogram A corresponding to the icon A and the main program ID of the main program to the server 3 (step A7). Upon receipt of these transmit data, the server 3 creates the release key (step A8). The sever next selects a new icon (icon B) (step E1) and sends it together with the release key to the information terminal 1 (step E2).

Upon receipt of the release key and the new icon, the information terminal 1 first stores the new icon into the second memory 12 (step B5), then displays the release key on the display 17 (step E3) and releases the restriction of use of the subprogram A so that it becomes available (step A9). The icon ID of the new icon is entered into the upgrade management DB and the record pointer is incremented (step E4).

The display controller 16 erases the icon A displayed on the display 17 (step A10) and instead displays the icon B on the display 17 so as to prompt the user to purchase the subprogram B next (step A11).

The following invention is extracted from the embodiments described above.

An information terminal device according to the first aspect of the present invention is characterized by comprising: an acquisition unit acquiring language identification information concerning a language used on a display screen;

a storage unit storing address information of a server; a language identification information synthesizer synthesizing the language identification information into the address information; and a transmitter transmitting. the address information to the server.

An information terminal device according to the second aspect of the present invention is characterized by comprising: an input unit inputting a user's voice; a use language recognizer recognizing a use language based on the user's voice; a storage unit storing address information of a server; an acquisition unit acquiring language identification information concerning a use language recognized by the use recognition means; a language identification information synthesizer reading address information from the storage unit and automatically synthesizing the language identification information with the address information, when the language identification information is acquired; and a transmitter transmitting the address information to a server.

In the above-mentioned first or second aspect, the following modes are preferable. The above-mentioned aspects may be applied independently or may be properly applied in combination.

(1) The language identification information is a serial number of software operating on the information terminal device.

(2) The language identification information is a model number or a serial number of a peripheral device connected to the information terminal device.

(3) The language identification information synthesizer synthesizes the language identification information which is different from a domain name or an IP address representing a country of a transmission source so as to follow the domain name or IP address.

An information terminal device according to the third aspect of the present invention is characterized by comprising: a display unit displaying link information for linking with a transmission server on a display screen; a storage unit storing address information of the transmission server; an acquisition unit acquiring language identification information concerning a language used on the display screen; a language identification information synthesizer, when the link information is selected, reading out the address information and automatically synthesizing the acquired language identification information with the address information; a specification unit specifying a user; and a transmitter transmitting the address information and user information to the server. With this configuration, it is preferable to further comprise display controller receiving information which can be displayed in a language corresponding to the language identification information from the server, and displaying the information on the display unit in a language corresponding to the language identification information.

A computer-readable program according to the fourth aspect of the present invention is characterized by comprising: code means for acquiring language identification information concerning a language used on a display screen; code means for storing address information of a server; code means for, when the language identification information is acquired, reading the address information and automatically synthesizing the language identification information with the address information; and code means for transmitting the address information to the server.

A method of transmitting language identification information recognized by a information terminal device to a registered server and acquiring information corresponding to the language identification information from the server, according to the fifth aspect of the present invention is characterized by comprising: acquiring language identification information concerning a language used on a display screen of the information terminal device; reading address information from the server; automatically synthesizing the acquired language identification information with the read address information; transmitting to the server, address information obtained by synthesizing the language identification information and specific information for specifying the address information transmission user; and receiving information corresponding to a type of language requested from the information terminal device.

A computer-readable program operating on an information terminal device, which is communicable with a server via a communication line, according to the sixth aspect of the present invention is characterized by comprising: code means for storing address information of a server; code means for acquiring language identification information concerning a language used on a display screen; code means for reading address information contained in a transmission destination server; code means for displaying link information for linking with the transmission destination server on a display screen; code means for, when the link information is selected, automatically synthesizing the acquired language identification information with the read address information.

A method of transmitting language identification information recognized by a information terminal device to a registered server and acquiring information corresponding to the language identification information from the server, according to the seventh aspect of the present invention is characterized by comprising: displaying link information for linking with a transmission destination server on a display screen; acquiring language identification information concerning a language used on a display screen of the information terminal device; reading address information from the server; automatically synthesizing the acquired language identification information with the out address information, when the link information is selected; transmitting to the server, address information obtained by synthesizing the language identification information and specific information for specifying the address information transmission user; and receiving information corresponding to a type of language requested from the information terminal device. With this configuration, it is preferable that the link information is an icon, and the icon notifies that a function of the recognized natural language can be added onto a WEB.

A network system according to the eighth aspect of the present invention is characterized by comprising: an information terminal device; and a server for, based on language identification information transmitted from the information terminal device, transmitting corresponding information based on the language identification information, in which the information terminal device comprises: a recognizer recognizing a type of natural language used in a local information terminal device; a determination unit determining a server targeted for transmission; a storage unit storing language identification information for identifying the recognized language in an address corresponding to the server targeted for transmission; a transmitter transmitting to the server the address information having stored therein language identification information; a reception unit receiving information from the server; and a display unit displaying the received information, and the server comprises: a storage unit storing a plurality of information described in a plurality of natural languages corresponding to the language identification information; a selector selecting from the storage unit, based on the language identification information stored in the address information, information which can be described in a predetermined language which can be displayed in a language corresponding to the language identification information and a program corresponding to the language identification information; and a transmitter transmitting the selected display information to the information terminal device.

An information terminal device according to the ninth aspect of the present invention is characterized by comprising: a storage unit storing a first program, a plurality of second programs which are allowed to be activated by a predetermined release key and a plurality of link information which correspond to the plurality of second programs; a display unit displaying first link information selected from the plurality of link information; a transmitter transmitting to the server identification information for identifying the corresponding program stored in the storage unit, when the first link information is selected; a reception unit receiving a release key transmitted from the server as a result of the identification information having been verified by the server; a controller selecting a second program corresponding to the release key received from the server from the storage unit and selecting second link information corresponding to a second program different from the selected second program; and a display controller changing the first link information displayed on the display unit to the second link information.

An information terminal device according to the tenth aspect of the present invention is characterized by comprising: a storage unit storing a first program and first link information; a display unit displaying the first link information; a transmitter transmitting to the server identification information for identifying the first program or the first link information, when the first link information is selected; a reception unit receiving a second program transmitted from the server and second link information corresponding to a third program stored in the server after the identification information has been verified by the server, and a controller making the storage unit store the second program and the second link information received from the server and changing the first link information displayed on the display unit to the second link information stored in the storage unit.

An information terminal device according to the eleventh aspect of the present invention is characterized by comprising: a storage unit storing a first program and first link information; a display unit displaying the first link information; a transmitter transmitting to the server identification information for identifying the first program, when the first link information is selected; a reception unit receiving a second program transmitted from the server, second link information corresponding to an untransmitted third program, and a release key for allowing the second program to be activated after the identification information has been verified by the server; and a controller making the storage unit store the second program, the second link information and the release key received from the server and changing the first link information displayed on the display unit to the second link information stored in the storage unit.

An information terminal device according to the twelfth aspect of the present invention is characterized by comprising: a storage unit storing a first program, a plurality of second programs including a plurality of first link information; a display unit displaying first link information; a transmitter transmitting to the server identification information for identifying the first program, when the first link information is selected; a reception unit receiving a second program transmitted from the server after the identification information has been verified by the server, and a display controller selecting second link information for receiving a third program from the server from the storage unit and changing the first link information displayed on the display unit to the second link information.

An information terminal device according to the thirteenth aspect of the present invention is characterized by comprising: a storage unit storing a first program, first link information and a second program; a display unit displaying the first link information; a transmitter transmitting to the server identification information for identifying the second program stored in the storage unit, when the first link information is selected; a reception unit receiving a release key for allowing the predetermined second program transmitted from the server to be activated, second link information for requesting allowing a second program, which is different from the predetermined program, to be activated, after the identification information has been verified by the server; and a controller allowing access to the second program stored in the storage unit on the basis of the release key received from the server, and changing the first link information displayed on the display means to a second link information which corresponds to the corresponding second program.

In each of ninth to thirteenth aspects, it is preferable that the second program is an upgrading program to add functions to the first program, the link information corresponding to the second program includes an icon, and the icon indicates the possibility of addition of another upgrading program to add further different functions.

A computer-readable program operating on an information terminal device, which is communicable with a server via a communication line, according to the fourteenth aspect of the present invention is characterized by comprising: code means for storing a first program, a plurality of second programs which are allowed to be activated by a predetermined release key and a plurality of link information which correspond to the plurality of second programs; code means for displaying first link information selected from the plurality of link information; code means for transmitting to the server identification information for identifying a stored program, when the first link information is selected; code means for receiving a release key transmitted from the server as a result of the identification information having been verified by the server; code means for a controller selecting a second program corresponding to the release key received from the server and selecting second link information corresponding to a second program different from the selected second program; and code means for changing the displayed first link information to the second link information.

A computer-readable program operating on an information terminal device, which is communicable with a server via a communication line, according to the fifteenth aspect of the present invention is characterized by comprising: code means for storing a first program and first link information; code means for displaying the first link information; code means for transmitting to the server identification information for identifying the first program or the first link information, when the first link information is selected; code means for receiving a second program transmitted from the server and second link information corresponding to a third program stored in the server after the identification information has been verified by the server, and code means for storing the second program and the second link information received from the server and changing the displayed first link information to the stored second link information.

A computer-readable program operating on an information terminal device, which is communicable with a server via a communication line, according to the sixteenth aspect of the present invention is characterized by comprising: code means for storing a first program and first link information; code means for displaying the first link information; code means for transmitting to the server identification information for identifying the first program, when the first link information is selected; code means for receiving a second program transmitted from the server, second link information corresponding to an untransmitted third program, and a release key for allowing the second program to be activated after the identification information has been verified by the server; and code means for storing the second program, the second link information and the release key received from the server and changing the displayed first link information to the stored second link information.

A computer-readable program operating on an information terminal device, which is communicable with a server via a communication line, according to the seventeenth aspect of the present invention is characterized by comprising: code means for storing a first program, a plurality of second programs including a plurality of first link information; code means for displaying first link information; code means for transmitting to the server identification information for identifying the first program, when the first link information is selected; code means for receiving a second program transmitted from the server after the identification information has been verified by the server, and code means for selecting second link information for receiving a third program from the server from the plurality of link information and changing the displayed first link information to the second link information.

A computer-readable program operating on an information terminal device, which is communicable with a server via a communication line, according to the fifteenth aspect of the present invention is characterized by comprising: code means for storing a first program, first link information and a second program; code means for displaying the first link information; code means for transmitting to the server identification information for identifying the second program, when the first link information is selected; code means for receiving a release key for allowing the predetermined second program transmitted from the server to be activated, second link information for requesting allowing a second program, which is different from the predetermined program, to be activated, after the identification information has been verified by the server; and code means for allowing access to the stored second program on the basis of the release key received from the server, and changing the first link information displayed on the display means to a second link information which corresponds to the corresponding second program.

A method of adding a predetermined program to a program operating on an information terminal device, which is communicable with a server via a communication line, according to the nineteenth aspect of the present invention is characterized by comprising: storing a first program, a plurality of second programs which are allowed to be activated by a predetermined release key and a plurality of link information which correspond to the plurality of second programs; displaying first link information selected from the plurality of link information; transmitting to the server identification information for identifying a stored program, when the first link information is selected; receiving a release key transmitted from the server as a result of the identification information having been verified by the server; a controller selecting a second program corresponding to the release key received from the server and selecting second link information corresponding to a second program different from the selected second program; and changing the displayed first link information to the second link information.

A method of adding a predetermined program to a program operating on an information terminal device, which is communicable with a server via a communication line, according to the twentieth aspect of the present invention is characterized by comprising: storing a first program and first link information; displaying the first link information; transmitting to the server identification information for identifying the first program or the first link information, when the first link information is selected; receiving a second program transmitted from the server and second link information corresponding to a third program stored in the server after the identification information has been verified by the server, and storing the second program and the second link information received from the server and changing the displayed first link information to the stored second link information.

A method of adding a predetermined program to a program operating on an information terminal device, which is communicable with a server via a communication line, according to the twenty-first aspect of the present invention is characterized by comprising: storing a first program and first link information; displaying the first link information; transmitting to the server identification information for identifying the first program, when the first link information is selected; receiving a second program transmitted from the server, second link information corresponding to an untransmitted third program, and a release key for allowing the second program to be activated after the identification information has been verified by the server; and storing the second program, the second link information and the release key received from the server and changing the displayed first link information to the stored second link information.

A method of adding a predetermined program to a program operating on an information terminal device, which is communicable with a server via a communication line, according to the twenty-second aspect of the present invention is characterized by comprising: storing a first program, a plurality of second programs including a plurality of first link information; displaying first link information; transmitting to the server identification information for identifying the first program, when the first link information is selected; receiving a second program transmitted from the server after the identification information has been verified by the server, and selecting second link information for receiving a third program from the server from the plurality of link information and changing the displayed first link information to the second link information.

A method of adding a predetermined program to a program operating on an information terminal device, which is communicable with a server via a communication line, according to the twenty-third aspect of the present invention is characterized by comprising: storing a first program, first link information and a second program; displaying the first link information; transmitting to the server identification information for identifying the second program, when the first link information is selected; receiving a release key for allowing the predetermined second program transmitted from the server to be activated, second link information for requesting allowing a second program, which is different from the predetermined program, to be activated, after the identification information has been verified by the server; and allowing access to the stored second program on the basis of the release key received from the server, and changing the first link information displayed on the display means to a second link information which corresponds to the corresponding second program.

The above inventions have been described as the information terminal device; however, this is not restrictive. The present invention may also be implemented as an additional function purchasing program, a program function adding method, and a network system including an information terminal device and a server.

The present invention is not limited to the above-mentioned embodiments of the present invention.

An information terminal, a program, and a program purchasing method have been described as the invention according to the first to fifth embodiments. However, it is a matter of course that the present invention can be applied to a system, as described in the above-mentioned embodiments, and further, can be applied to a server for acquiring language information by URL analysis.

In the first to fifth embodiments, type of display language has been determined by a software serial number or a peripheral device model number. However, in the case where a user has specified a language in particular, such a configuration that the language is given higher priority may be provided. In addition, a language applied to a current display screen may be defined as a display language.

For example, although the sixth to tenth embodiments have been described as upgrading a program by clicking on an on-screen icon, a banner or text-based link information may be used instead of the icon.

Although the subprograms have been described as ones for upgrading the main program, they may be any other program related to the main program; for example, if the main program is a word processing program, the subprograms may be a graphics program, a spreadsheet program, a map drawing program, and so on.

Further, it is a matter of course that various modifications can be carried out without departing from the scope of the present invention.

According to the first to fifth embodiments of the present invention, information which can be displayed in a language identical to a language of an application program in use can always be obtained from a server.

According to the sixth to tenth embodiments, when a user desires to obtain a new program from a recording medium or communications circuit, a display related to that program is made so that the user can select it on the display. Thus, the user is allowed to select a desired program at once and obtain it with certainty.

Additional advantages and modifications will readily occur to those skilled in the art. Therefore, the present invention in its broader aspects is not limited to the specific details and representative devices and illustrated examples shown and described herein. Accordingly, various modifications may be made without departing from the spirit or scope of the general inventive concept as defined by the appended claims and their equivalents.

What is claimed is:

1. An information terminal device which communicates with a server via a communication line, comprising:
   a display which displays information;
   a storage unit which stores a first program and first link information corresponding to a second program which adds a first function to the first program;
   a display control unit which causes the first link information to be displayed on the display;
   a transmission unit which transmits to the sever, information containing at least one of first identification information for identifying the first program or second identification information for identifying the second program, when the first link information displayed on the display is selected; and
   a reception unit which receives the second program which is transmitted from the server in accordance with at least one of the first identification information or the second identification information,
   wherein after the reception unit receives the second program, the display control unit updates the first link information displayed on the display to second link information corresponding to a third program which adds a second function, and which differs from the first function, to the first program and causes the second link information to be displayed on the display.

2. The information terminal device according to claim 1, wherein the second link information is stored in advance in the storage unit.

3. The information terminal device according to claim 1, wherein the reception unit receives the second link information in addition to the second program, and the display control unit updates the first link information displayed on the display to the second link information received by the reception unit, and causes the second link information to be displayed on the display.

4. The information terminal device according to claim 3, which further comprises a program release unit which permits a program inhibited from being activated to be activated by using a release key, and
   wherein the reception unit receives a release key corresponding to the second program is received in addition to the second program and the second link information, and the program release unit permits the second program to be activated by using the release key received in the reception processing.

5. The information terminal device according to claim 1, wherein the second program is an addition program which adds the first function to the first program, and link information corresponding to the second program is displayed on the display as an icon which suggests that the program which adds the first function is permitted to be added.

6. The information terminal device according to claim 2, wherein the second program is an addition program which adds the first function to the first program, and link information corresponding to the second program is displayed on the display as an icon which suggests that the program which adds the first function is permitted to be added.

7. The information terminal device according to claim 3, wherein the second program is an addition program which adds the first function to the first program, and link information corresponding to the second program is displayed on the display as an icon which suggests that the program which adds the first function is permitted to be added.

8. The information terminal device according to claim 4, wherein the second program is an addition program which adds the first function to the first program, and link information corresponding to the second program is displayed on the display as an icon which suggests that the program which adds the first function is permitted to be added.

9. A non-transitory recording medium which stores a computer-readable first program for use in operating an information terminal device which communicates with a server via a communication line, the first program causes the information terminal device to execute:
   a storage processing of storing first link information corresponding to a second program which adds a first function to the first program, in a memory of the information terminal device;
   a display processing of displaying the first link information on a display of the information terminal device;

a transmission processing of transmitting to the sever, information containing at least one of first identification information for identifying the first program or second identification information for identifying the second program, when the first link information displayed on the display is selected;

a reception processing of receiving the second program which is transmitted from the server in accordance with at least one of the first identification information or the second identification information; and an update processing of updating the first link information displayed on the display by the display processing to second link information corresponding to a third program which adds a second function, and which differs from the first function, to the first program, and causing the second link information to be displayed on the display.

10. The computer-readable program stored in the non-transitory recording medium according to claim 9, wherein the second link information is stored in advance in the memory.

11. The computer-readable program stored in the non-transitory recording medium according to claim 9, wherein in the reception processing, the second link information is received in addition to the second program, and in the update processing, the first link information displayed on the display is updated to the second link information received in the reception processing, and the second link information is displayed on the display.

12. The computer-readable program stored in the non-transitory recording medium according to claim 11, which further causes the information terminal device to execute a program release processing of permitting a program inhibited from being activated to be activated by using a release key, and wherein in the reception processing, a release key corresponding to the second program is received in addition to the second program and the second link information, and the program release processing permits the second program to be activated by using the release key received in the reception processing.

* * * * *